United States Patent
Nishida et al.

(10) Patent No.: US 9,597,800 B2
(45) Date of Patent: Mar. 21, 2017

(54) ELASTIC DEFORMATION COMPENSATION CONTROL DEVICE FOR ARTICULATED ROBOT

(71) Applicant: Kobe Steel, Ltd., Hyogo (JP)

(72) Inventors: Yoshiharu Nishida, Kobe (JP); Takashi Wada, Kobe (JP); Yoshihide Inoue, Fujisawa (JP); Shuichi Inada, Fujisawa (JP)

(73) Assignee: Kobe Steel, Ltd., Hyogo (JP)

( * ) Notice: Subject to any disclaimer, the term of this patent is extended or adjusted under 35 U.S.C. 154(b) by 42 days.

(21) Appl. No.: 14/766,007

(22) PCT Filed: Feb. 14, 2014

(86) PCT No.: PCT/JP2014/053531
§ 371 (c)(1),
(2) Date: Aug. 5, 2015

(87) PCT Pub. No.: WO2014/126218
PCT Pub. Date: Aug. 21, 2014

(65) Prior Publication Data
US 2015/0367511 A1    Dec. 24, 2015

(30) Foreign Application Priority Data

Feb. 15, 2013 (JP) .................... 2013-027947

(51) Int. Cl.
B25J 9/00 (2006.01)
B25J 9/16 (2006.01)
(Continued)

(52) U.S. Cl.
CPC ............ B25J 9/1638 (2013.01); B23K 9/095 (2013.01); B23K 9/124 (2013.01); B23K 9/173 (2013.01);
(Continued)

(58) Field of Classification Search
CPC combination set(s) only.
See application file for complete search history.

(56) References Cited

U.S. PATENT DOCUMENTS 5,455,497 A * 10/1995 Hirose ................ B62D 57/032
180/8.1
6,341,244 B1 * 1/2002 Papiernik ............... G05B 19/19
700/159
(Continued)

FOREIGN PATENT DOCUMENTS

JP    S61-201304 A    9/1986
JP    H06-222817 A    8/1994
(Continued)

OTHER PUBLICATIONS

International Search Report and Written Opinion of the International Searching Authority, PCT/JP2014/053531, May 20, 2014.

*Primary Examiner* — Jonathan L Sample
(74) *Attorney, Agent, or Firm* — Studebaker & Brackett PC

(57) ABSTRACT

This control device (10) for compensating for the elastic deformation of an articulated robot is configured from a joint angle command value calculation unit (100), an axial force torque calculation unit (200), a first dynamic characteristic computing unit (300), a feedback control unit (500), and a motor angle command value calculation unit (600). The first dynamic characteristic computing unit (300) is configured from an interpolation unit configured from an N-ary curve interpolation, and a filter unit configured from an M-ary filter, with N+M being at least 4.

5 Claims, 19 Drawing Sheets

(51) Int. Cl.
 *B23K 9/095* (2006.01)
 *B23K 9/12* (2006.01)
 *B23K 9/173* (2006.01)
 *B23K 9/32* (2006.01)
 *B23K 37/02* (2006.01)
 *B25J 9/06* (2006.01)

(52) U.S. Cl.
 CPC .......... *B23K 9/32* (2013.01); *B23K 37/0229* (2013.01); *B25J 9/06* (2013.01); *B25J 9/1605* (2013.01); *B25J 9/1633* (2013.01); *B25J 9/1641* (2013.01); *G05B 2219/34119* (2013.01); *G05B 2219/39186* (2013.01); *G05B 2219/41222* (2013.01); *G05B 2219/41225* (2013.01); *G05B 2219/41426* (2013.01); *G05B 2219/41436* (2013.01); *G05B 2219/45104* (2013.01); *G05B 2219/49384* (2013.01); *Y10S 901/02* (2013.01)

(56) References Cited

U.S. PATENT DOCUMENTS

| | | | |
|---|---|---|---|
| 6,774,598 B1* | 8/2004 | Kohler | G05B 19/41 318/561 |
| 8,419,804 B2* | 4/2013 | Herr | A61F 2/60 623/24 |
| 8,512,415 B2* | 8/2013 | Herr | A61F 2/60 623/24 |
| 2003/0033029 A1* | 2/2003 | Kohler | G05B 19/4103 700/13 |
| 2005/0021176 A1* | 1/2005 | Takenaka | B62D 57/032 700/245 |
| 2006/0173578 A1* | 8/2006 | Takenaka | B62D 57/032 700/245 |
| 2007/0164695 A1* | 7/2007 | Hagihara | B25J 9/1602 318/568.11 |
| 2008/0009771 A1* | 1/2008 | Perry | B25J 9/0006 600/587 |
| 2011/0098856 A1* | 4/2011 | Yoshiike | B62D 57/032 700/246 |
| 2011/0270443 A1* | 11/2011 | Kamiya | G05B 19/401 700/245 |
| 2012/0259463 A1* | 10/2012 | Orita | B25J 9/1648 700/245 |
| 2014/0222186 A1* | 8/2014 | Wada | B25J 9/1641 700/114 |
| 2014/0222207 A1* | 8/2014 | Bowling | A61B 34/32 700/261 |
| 2015/0105905 A1* | 4/2015 | Nishida | B25J 9/1641 700/254 |

FOREIGN PATENT DOCUMENTS

| | | |
|---|---|---|
| JP | H10-217173 A | 8/1998 |
| JP | H11-134012 A | 5/1999 |
| JP | 2003-280703 A | 10/2003 |
| JP | 2004-005469 A | 1/2004 |
| JP | 2004-025341 A | 1/2004 |
| JP | 2005-102427 A | 4/2005 |
| JP | 2005-186235 A | 7/2005 |
| JP | 2008-004007 A | 1/2008 |

* cited by examiner

SECOND-DEGREE INTERPOLATION

THIRD-DEGREE INTERPOLATION

ENLARGED FIGURE OF Z COMPONENT OF THIRD-DEGREE INTERPOLATION

ELASTIC DEFORMATION COMPENSATION CONTROL DEVICE FOR ARTICULATED ROBOT

TECHNICAL FIELD

The present invention relates to control of an articulated robot.

BACKGROUND ART

To weld a plurality of base materials using arc welding, weaving is employed. In weaving, a weld electrode is advanced in the weld direction while performing a sine wave weaving operation in the right and left directions. In general, weaving is performed by swinging a welding torch right and left or tilting a welding torch right and left about its axis. To cause an articulated robot to perform such weaving, a high accuracy of trajectory control is required.

Such articulated robots are servo-controlled on an axis-by-axis basis. However, since the natural frequency is low, speed feedforward, for example, is rarely applied to prevent vibration. Thus, the phase delay of the actual feedback value against the target value is large, and the response property of a speed controller of a servo control unit varies from axis to axis and, thus, a trajectory error is generated. In addition, a motor that drives each of shafts of the articulated robot is connected to an arm via a speed reducer. To compensate for elastic deformation caused by insufficient rigidity of the speed reducer, the motor needs to operate as instructed by a command value. However, since feedforward does not sufficiently function, it is almost impossible for the motor to operate as instructed by the command value. Thus, elastic deformation compensation does not satisfactorily work. To control elastic deformation compensation in articulated robots, the following technologies have been developed.

Japanese Unexamined Patent Application Publication No. 61-201304 (PTL 1) describes a technique for highly accurately performing control to place a robot arm at a position indicated by a position command value even when the mechanical rigidity of the joints of the speed reducer, for example, is low. In the position control technique, by substituting the position command values of the arms that constitute a robot, the speeds obtained as the first derivatives of the position command values, and the accelerations obtained as second derivatives of the position command values for the equation of motion of the robot arm obtained by taking into account the mechanical rigidities of the joints of the arm, the torque applied to each of the joints is calculated. Thereafter, by dividing the calculated torque by a constant, a function, or a mechanical spring rigidity of the joint given in a table inside a control unit, the deflection angle generated by the mechanical rigidity of the joint is obtained. Subsequently, the obtained deflection angle is added to the position command value, so that a new position command value that cancels out the deflection of the joint is obtained.

Japanese Unexamined Patent Application Publication No. 2005-186235 (PTL 2) describes a control unit for controlling a robot including a plurality of shafts that interfere with one another and that operate as instructed even when interference forces are applied. The control unit controls a robot having a plurality of shafts that interfere with one another. The robot further includes a position control unit and a speed control unit that operate, as instructed, the shafts each including a motor, an arm connected to the motor via a speed reducer, and a motor position detector that detects the position of the motor. The control unit includes an interference force calculation unit that calculates an interference force that acts on another shaft due to the instruction to the shaft, a non-interference torque signal generating unit that obtains, from the command to the shaft and a calculated value of the interference force exerted from another shaft, a motor torque command signal that causes the shaft to operate as instructed even when an interference force is applied by another shaft, and a non-interference position signal generating unit that obtains, from the command to the shaft and a calculated value of the interference force exerted from another shaft, a motor position signal that causes the shaft to operate as instructed even when the interference force is applied from another shaft.

CITATION LIST

Patent Literature

PTL 1: Japanese Unexamined Patent Application Publication No. 61-201304
PTL 2: Japanese Unexamined Patent Application Publication No. 2005-186235

SUMMARY OF INVENTION

Technical Problem

According to PTL 1 described above, deflection (elastic deformation) caused by insufficient rigidity of, for example, the speed reducer is calculated using, for example, a joint angle target value, and the positional accuracy is improved by adding an amount of the elastic deformation to an angle command value for the motor so that the elastic deformation is compensated for. However, since, as described above, optimum feedforward control is not performed, the motor does not operate as instructed by the command value. That is, the elastic deformation compensation is insufficient.

PTL 2 described elastic deformation compensation performed while taking into account interference occurring between the shafts. However, the first derivative value and the second derivative value of the arm acceleration are required and, thus, the control system is easily influenced by noise. In addition, only an abrupt operation increases the second derivative value of the arm acceleration to an astronomical value. That is, achievement of the elastic deformation compensation is significantly restricted.

That is, in existing techniques, the following issues still remain unsolved:

(1) The elastic deformation compensation and the axial force torque compensation cannot be effectively applied when the natural vibration of a robot is low. Accordingly, the effect of elastic deformation cannot be compensated for, which decreases the accuracy.

(2) When phase delay occurs in the servo control unit, the elastic deformation compensation control cannot be effectively performed. Accordingly, the effect of elastic deformation cannot be compensated for, which decreases the accuracy.

(3) Since the servo control property varies on a shaft-by-shaft basis, the response of the shaft varies on a shaft-by-shaft basis. Accordingly, the accuracy of trajectory decreases.

(4) The phase difference occurring when the calculation period of the command value is delayed behind the calculation period of the servo control unit causes the accuracy of trajectory to decrease.

(5) In weaving performed by a welding robot, it is very important to make the phase delays of the weaving period and the gain properties of all shafts the same. However, it is very difficult to make the phase/gain properties the same in a high-frequency weaving operation due to a variation in the servo property and difference in the property of shaft caused by elastic deformation generated by the speed reducer.

To address the above-described issues, the present invention provides an elastic deformation compensation control device for an articulated robot that includes a plurality of shafts. The elastic deformation compensation control device allows the articulated robot to perform an operation, such as weaving, with high accuracy of trajectory by compensating for an adverse effect of the elastic deformation of each of the shafts.

Solution to Problem

To address the above-described issues, the elastic deformation compensation control device for the articulated robot according to the present invention provides the following technical means. That is, according to the present invention, an elastic deformation compensation control device for an articulated robot including a motor for driving a plurality of joint shafts of the articulated robot and an arm connected to the motor via a speed reducer that elastically deforms, where the device drives the joint shafts to cause a tool attached to the articulated robot to perform a desired operation, is provided. The device includes a joint angle command value calculation unit configured to calculate a joint angle command value $\theta lc$ of each of the joint shafts for realizing a desired tool operation and output the joint angle command value $\theta lc$, an axial force torque calculation unit configured to calculate an axial force torque fc that is generated when each of the joint shafts operates as instructed by the joint angle command value $\theta lc$ and that is exerted on the joint shaft from the joint angle command value $\theta lc$ on the basis of a kinetic model and output the axial force torque fc, a motor angle command value calculation unit configured to calculate a motor angle command value $\theta mc$ from the joint angle command value $\theta lc$ and the axial force torque fc on the basis of a parameter of the joint shaft including a rigidity parameter and output the motor angle command value $\theta mc$, a first dynamic characteristic computing unit having a high-frequency cutoff characteristic including a cutoff frequency that is lower than the natural vibration frequency of the robot, the first dynamic characteristic computing unit performing a filtering process on the motor angle command value $\theta mc$ and outputting the motor angle target value $\theta md$ subjected to the filtering process, a motor angle control unit configured to receive the motor angle target value $\theta md$ as a target value for the motor, and a motor current control unit configured to receive, as a target value, a value obtained by adding the axial force torque compensation value fd to a motor torque command value output from the motor angle control unit. The first dynamic characteristic computing unit is configured from an interpolation unit configured by Nth-degree curve interpolation and a filter unit configured by an Mth-order filter, and (N+M) is set to a value greater than or equal to 4.

It is desirable that the Mth-order filter that constitutes the filter unit be given by the following expression (1):

[Formula 1]

$$\frac{a_0 \cdot s^0}{b_M \cdot s^M + b_{M-1} \cdot s^{M-1} + \ldots + b_1 \cdot s^1 + b_0 \cdot s^0} \quad (1)$$

It is desirable that the Mth-order filter that constitutes the filter unit be given by the following expression (2):

[Formula 2]

$$\frac{a_p \cdot s^p + a_{p-1} \cdot s^{p-1} + \ldots + a_1 \cdot s^1 + a_0 \cdot s^0}{b_{M+p} \cdot s^{M+p} + b_{M+p-1} \cdot s^{M+p-1} + \ldots + b_1 \cdot s^1 + b_0 \cdot s^0} \quad (2)$$

It is desirable that an (M−1)th derivative value of a waveform of a step response of an Mth-order filter that constitutes the filter unit be continuous. It is desirable that an (M−2)th derivative value of a waveform of an impulse response of an Mth-order filter that constitutes the filter unit be continuous.

Advantageous Effects of Invention

By using the elastic deformation compensation control device according to the present invention, an articulated robot having a plurality of shafts can compensate for an adverse effect of the elastic deformation of each of the shafts and perform an operation such as weaving with a high accuracy of trajectory.

DESCRIPTION OF EMBODIMENTS

An elastic deformation compensation control device for an articulated robot according to an embodiment of the present invention is described in detail below with reference to the accompanying drawings. Note that in the description below, the same reference symbol is used to indicate elements which are the same. The name and the functions of the elements are also the same. Accordingly, detailed description of the element is not repeated. In addition, while description below is made with reference to an articulated robot that causes the welding torch serving as an object to be controlled to perform a tilting operation (a weaving operation), the welding torch is only an example. The elastic deformation compensation control device according to the present invention is widely applicable to control of driving of a plurality of joint shafts of an articulated robot including a motor that drives the joint shaft and an arm connected to the motor via the speed reducer that elastically deforms so that a tool attached to the articulated robot performs a desired operation.

Basic Embodiment

A vertical articulated robot (hereinafter also simply referred to as an "articulated robot") having the elastic deformation compensation control device according to the embodiment is schematically described first.

Figure 16:
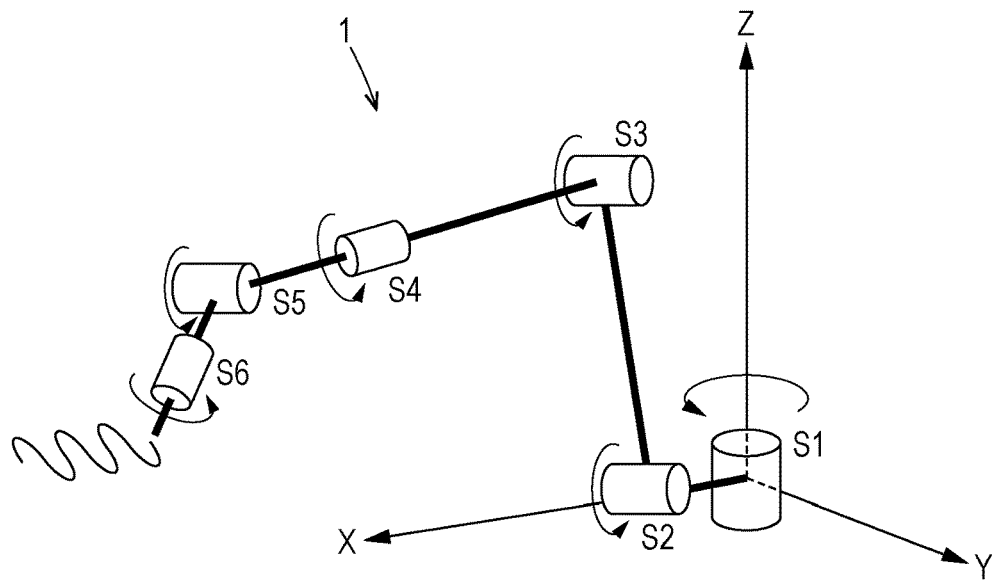
FIG. 16 is a schematic illustration of the architecture of an articulated robot having the elastic deformation compensation control device applied thereto.

FIG. 16 is a schematic illustration of an articulated robot 1 having an elastic deformation compensation control device of the present embodiment applied thereto. The articulated robot 1 is an example of a robot that causes a welding torch to perform a tilting operation (a weaving operation). The articulated robot 1 is a vertical articulated robot and has six joints, that is, joints S1 to S6. The welding torch is attached to the top end of an S6 shaft. Arc welding is executed by a welding wire fed out from the welding torch. The articulated robot 1 is set so as to perform an operation to move in a weld work zone between a predetermined weld start point and a predetermined weld end point in a weld line direction extending from the weld start point to the weld end point and simultaneously tilt the welding wire with a predetermined amplitude and at a predetermined frequency (a weaving operation).

In addition to the body of the articulated robot 1 that is illustrated, the articulated robot 1 includes a control unit (a servo control unit) that has a teach pendant and that servo-controls each of the shafts (not illustrated) and a higher-layer computer (a higher-layer CPU) (not illustrated). The elastic deformation compensation control device according to the present exemplary embodiment is formed by the control unit and the higher-layer computer.

The control unit (the servo control unit) performs control so that the welding torch mounted in the articulated robot 1 moves and performs a weaving operation following the above-described weld line in accordance with a pre-taught program. The teaching program can be generated using a teach pendant connected to the control unit. Alternatively, the teaching program can be generated using an off-line teach system using the higher-layer computer. In either case, the teaching program is pre-generated before an actual operation is performed.

The higher-layer computer generates a weld path or a weaving operation command based on the generated weld path.

Figure 13:
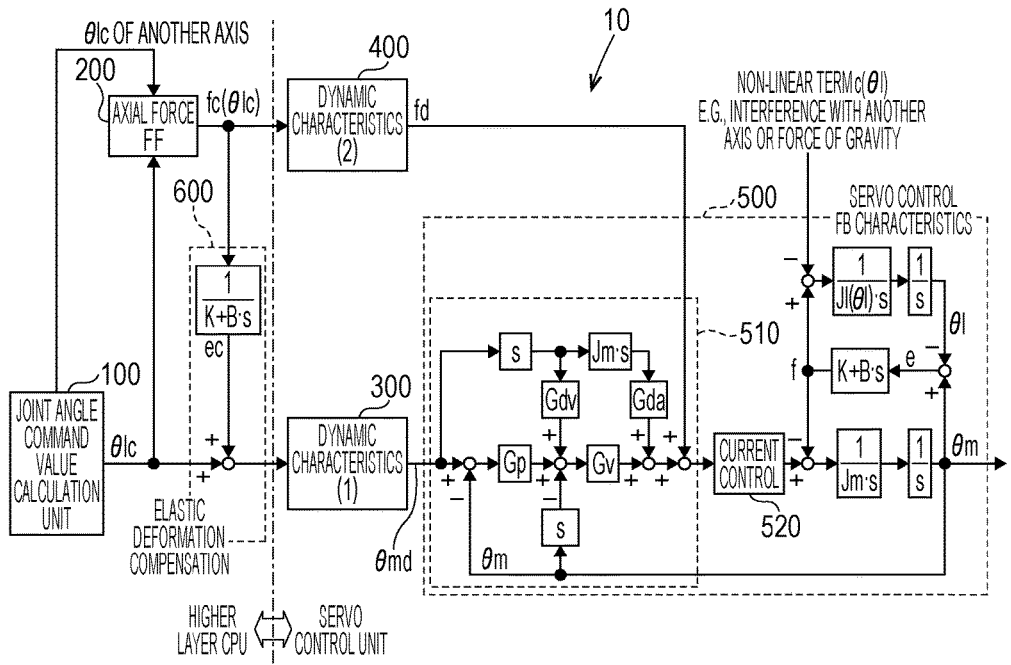
FIG. 13 is a block diagram of an elastic deformation compensation control device to which the dynamic characteristics (1) according to the embodiment is applied.
Figure 14A:
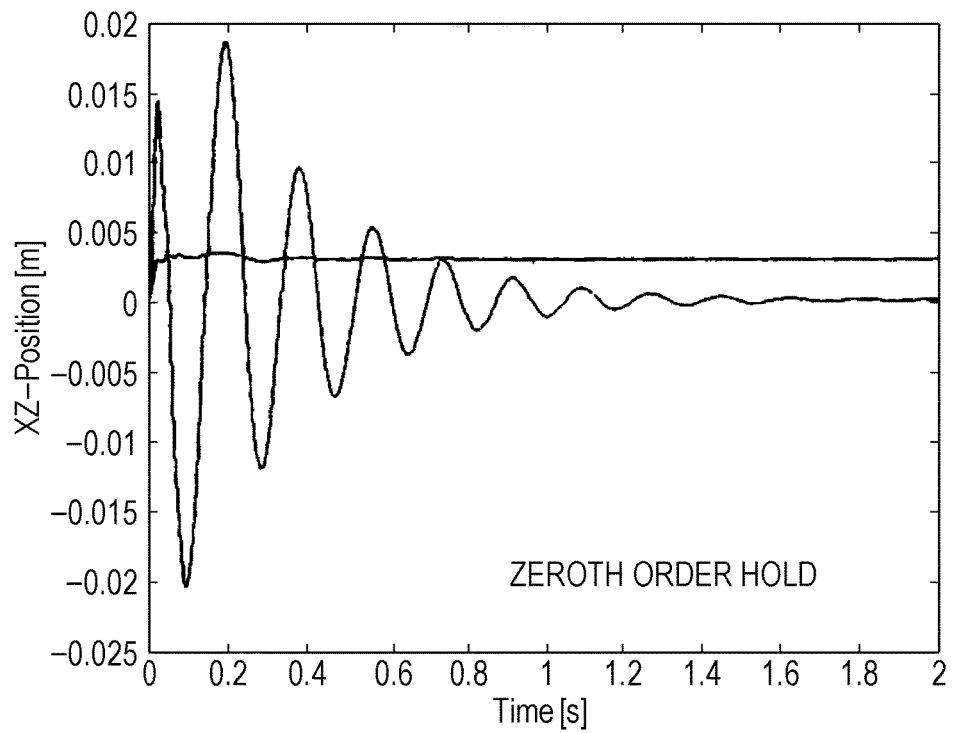
FIG. 14A illustrates the result of control (the operations in the X-axis and Z-axis directions) performed by the dynamic characteristics (1) configured using an existing technique (the zeroth-order hold).
Figure 14B:
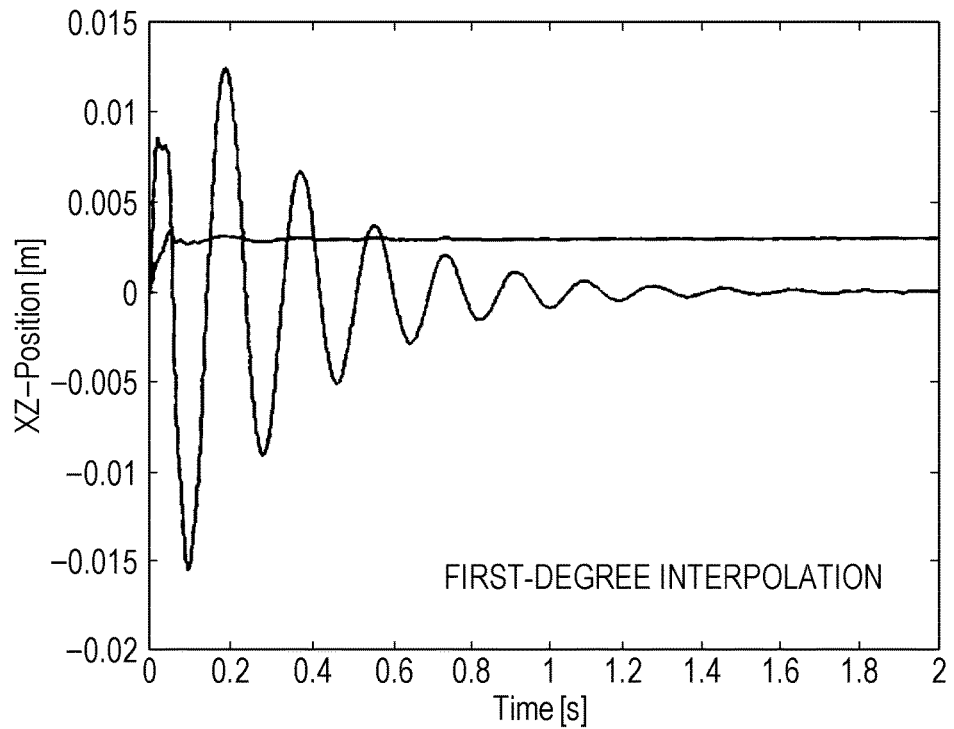
FIG. 14B illustrates the result of control (the operations in the X-axis and Z-axis directions) performed by the dynamic characteristics (1) configured using an existing technique (the first-degree interpolation).
Figure 14C:
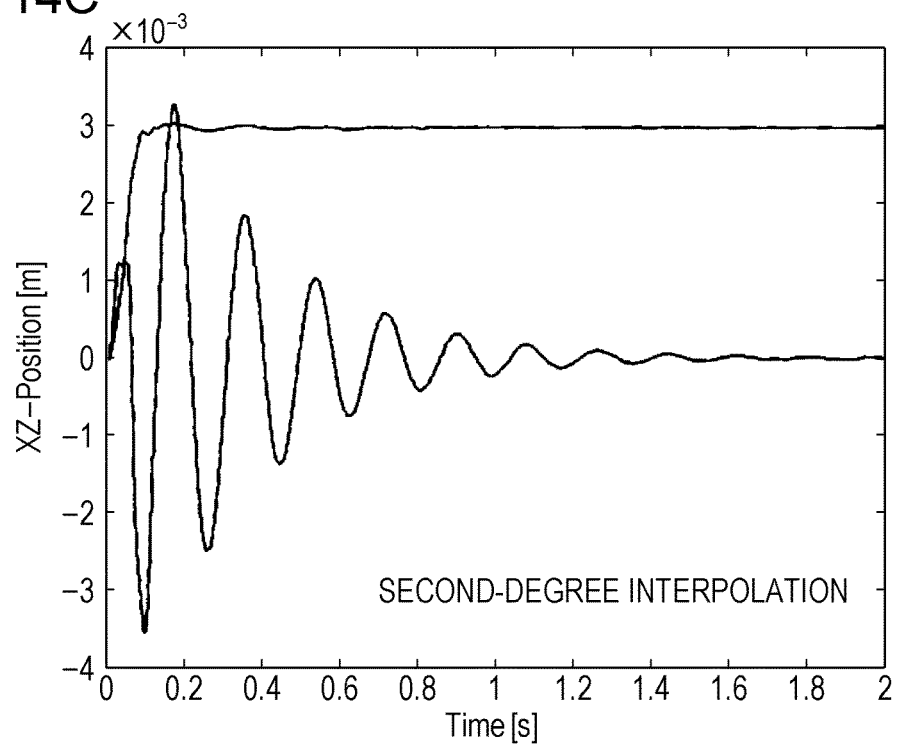
FIG. 14C illustrates the result of control (the operations in the X-axis and Z-axis directions) performed by the dynamic characteristics (1) configured using an existing technique (the second-degree interpolation).
Figure 14D:
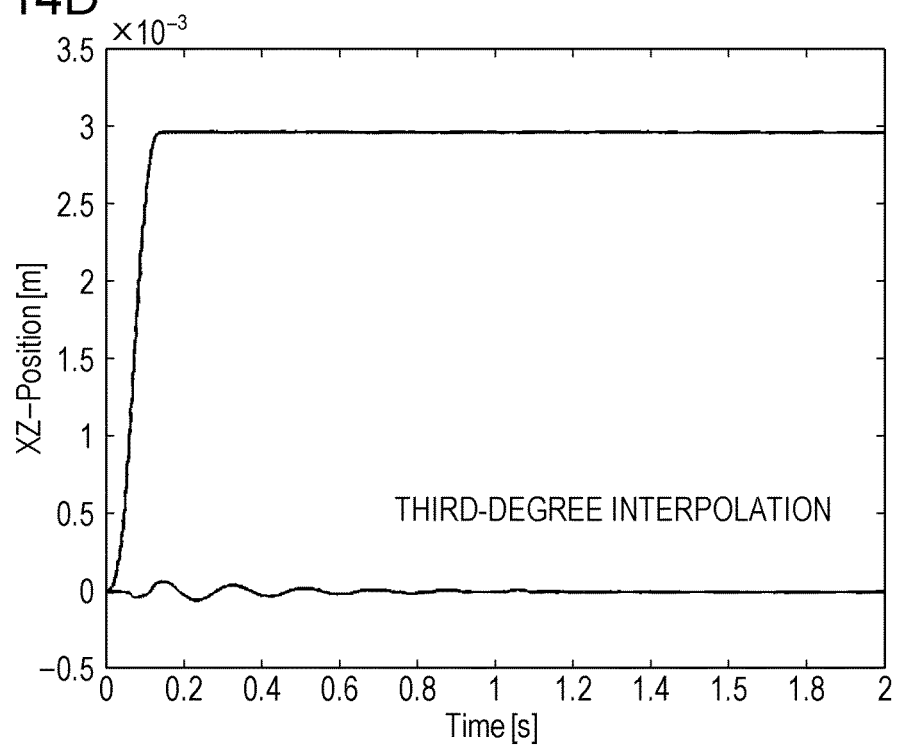
FIG. 14D illustrates the result of control (the operations in the X-axis and Z-axis directions) performed by the dynamic characteristics (1) configured using an existing technique (the third-degree interpolation).
Figure 14E:
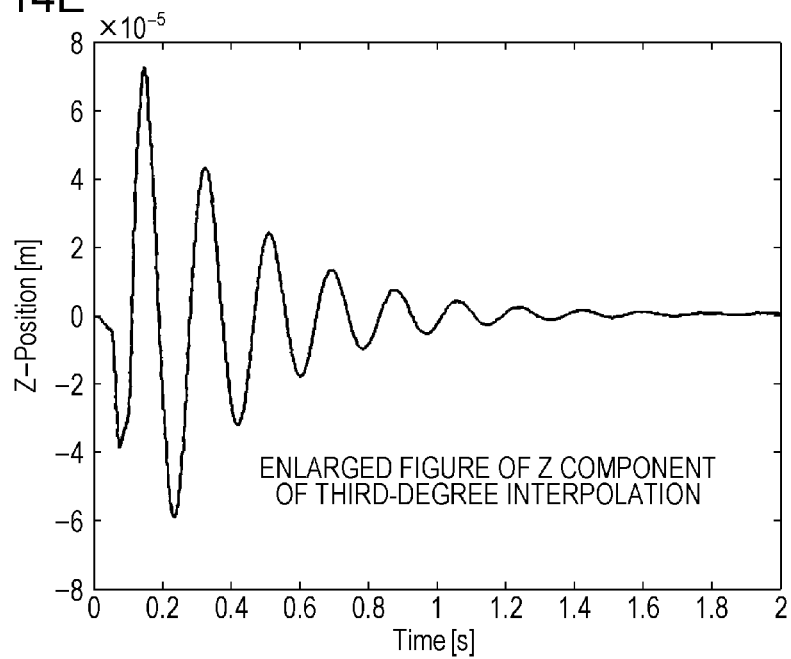
FIG. 14E illustrates the result of control (an enlarged view of the operation in the Z-axis direction) performed by the dynamic characteristics (1) configured using an existing technique (the third-degree interpolation).

FIG. 13 is a block diagram of the control performed by the elastic deformation compensation control device 10 that controls the articulated robot 1 illustrated in FIG. 16. As described above, the elastic deformation compensation control device 10 is configured so as to include a portion realized by the higher-layer CPU and a portion realized by the servo control unit.

The elastic deformation compensation control device 10 drives a plurality of joint shafts so as to cause a tool (the welding torch in the present embodiment) attached to the articulated robot 1 to perform a desired operation (e.g., a weaving operation).

The elastic deformation compensation control device 10 is formed from a joint angle command value calculation unit 100, an axial force torque calculation unit (illustrated as "axial force FF") 200, and a motor angle command value calculation unit (illustrated as "elastic deformation compensation") 600, each realized by the higher-layer CPU. The elastic deformation compensation control device 10 is further formed from a first dynamic characteristic computing unit (illustrated as "dynamic characteristics (1)") 300, a second dynamic characteristic computing unit (illustrated as "dynamic characteristics (2)") 400, and a feedback control unit (illustrated as "servo control FB characteristics") 500, each realized by the servo control unit. The feedback control unit 500 is configured so as to include a motor angle control unit 510 and a motor current control unit (illustrated as "current control") 520. Note that the characteristics of all the element of the control block are dynamic characteristics (even when not stated as "dynamic characteristics"). In addition, "FB" stands for "feedback", and "FF" stands for "feedforward".

The joint angle command value calculation unit 100 calculates a joint angle command value θlc of each of the joint shafts for realizing a weaving operation performed by the welding torch and outputs the joint angle command value θlc.

The axial force torque calculation unit 200 calculates an axial force torque fc that is to be exerted on each of the joint shafts and that is generated when the joint shaft operates as instructed by the joint angle command value θlc output from the joint angle command value calculation unit 100 using the joint angle command value θlc on the basis of a kinetic model. Thereafter, the axial force torque calculation unit 200 outputs the calculated axial force torque fc.

The motor angle command value calculation unit 600 calculates a motor angle command value θmc from the joint angle command value θlc and the axial force torque fc on the basis of a parameter including a rigidity parameter of the joint shaft and outputs the calculated motor angle command value θmc.

More specifically, the axial force torque calculation unit 200 calculates the axial force torque fc to be exerted on each of the joint shafts when the joint shaft operates as instructed by the joint angle command value θlc on the basis of the joint angle command value θlc. The motor angle command value calculation unit 600 calculates the amount of elastic deformation ec from the axial force torque fc on the basis of a shaft rigidity K and a viscosity B (the viscosity is negligible since the viscosity is small) and, thereafter, calculates the motor angle command value θmc from the joint angle command value θlc and the elastic deformation ec.

The first dynamic characteristic computing unit 300 performs a filtering process on the motor angle command value θmc output from the motor angle command value calculation unit 600 and outputs a motor angle target value θmd subjected to the filtering process. The first dynamic characteristic computing unit 300 has a high-frequency cutoff characteristic so as to have a cutoff frequency that is lower than the natural vibration frequency of the articulated robot 1.

The second dynamic characteristic computing unit 400 performs a filtering process on at least one of the input to the axial force torque calculation unit 200 and the output from the axial force torque calculation unit 200 and outputs an axial force torque compensation value fd subjected to the filtering process. In FIG. 13, the second dynamic characteristic computing unit 400 performs a filtering process on the output from the axial force torque calculation unit 200. The second dynamic characteristic computing unit 400 has a high-frequency cutoff characteristic so as to have a cutoff frequency that is lower than or equal to the cutoff frequency of the first dynamic characteristic computing unit 300.

Note that the first dynamic characteristic computing unit 300 and the second dynamic characteristic computing unit 400 may have the same characteristics. If the first dynamic characteristic computing unit 300 and the second dynamic characteristic computing unit 400 have the same characteristics, the first dynamic characteristic computing unit 300 is equivalent to the elastic deformation compensation control device disposed on the output side of the joint angle command value calculation unit 100. The technique of the present invention (described in detail below) is applicable to even such an elastic deformation compensation control device.

The motor angle target value θmd is input to the motor angle control unit 510 as a target value for the motor. The motor angle control unit 510 has speed feedforward control and/or acceleration feedforward control. Gda and Gdv indicate an acceleration feedforward gain and a speed feedforward gain, respectively. Each of Gda and Gdv is in the range from 0 to 1.

A value obtained by adding the axial force torque compensation value fd output from the second dynamic characteristic computing unit 400 to the motor torque command value output from the motor angle control unit 510 is input to the motor current control unit 520 as a target value.

The elastic deformation compensation control device 10 illustrated in the block diagram of FIG. 13 has the following features.

That is, the second dynamic characteristic computing unit 400, which serves as a non-linear term, is disposed on the upstream and/or downstream of the axial force torque calculation unit 200 (only on the downstream in this example). The second dynamic characteristic computing unit 400 has a high-frequency cutoff characteristic that cuts off a high-frequency band higher than or equal to that of the first dynamic characteristic computing unit 300. That is, the cutoff frequency of the second dynamic characteristic computing unit 400 is lower than or equal to the cutoff frequency of the first dynamic characteristic computing unit 300.

According to such a configuration, a high frequency including a natural vibration component contained in the joint angle command value θlc can be prevented by the first dynamic characteristic computing unit 300. In addition, a high frequency including the natural vibration component contained in the axial force torque fc can be prevented by the second dynamic characteristic computing unit 400. In this manner, a high-frequency vibration occurring in the articulated robot 1 can be prevented.

In addition, even when the articulated robot 1 is operated in the XYZ space at a low frequency, a high frequency that turns into double or triple high-frequency component of a joint angle is generated at a position at which Jacobian abruptly changes (e.g., in the vicinity of a singular point). Furthermore, even when the articulated robot 1 is operated in a joint angle space at low frequency, a high frequency that is a double or triple component of the joint angle is generated, since the non-linear term includes a squared term of the speed. Accordingly, by processing the axial force torque fc, which is a non-linear term output from the axial force torque calculation unit 200, using the second dynamic characteristic computing unit 400 having the high-frequency cutoff characteristic higher than or equal to the high-frequency cutoff characteristic of the first dynamic characteristic computing unit 300 and by using the resultant value as the axial force torque compensation value fd, high-frequency vibration occurring in the articulated robot 1 is further reduced.

First Embodiment

By using the elastic deformation compensation control device 10 described above, the articulated robot 1 can compensate for the adverse effect of elastic deformation of each of the shafts and perform an operation, such as weaving, with high accuracy of trajectory. However, the present inventors discovered that vibration of the top end of the welding torch occurs if the elastic deformation compensation and the feedforward control are performed without appropriate design of the dynamic characteristics (1) provided in the elastic deformation compensation control device 10 illustrated in the block diagram of FIG. 13, that is, without appropriate design of the first dynamic characteristic computing unit 300. The same situation occurs even when the first dynamic characteristic computing unit 300 is disposed on the input side of the axial force torque calculation unit 200. In addition, the same situation occurs even when the first dynamic characteristic computing unit 300 separates into two dynamic characteristic portions and, thereafter, one of the dynamic characteristic portions is disposed at the "position of the first dynamic characteristic computing unit 300 illustrated in FIG. 13" and the other is disposed on the "input side of the axial force torque calculation unit 200".

Figure 1:
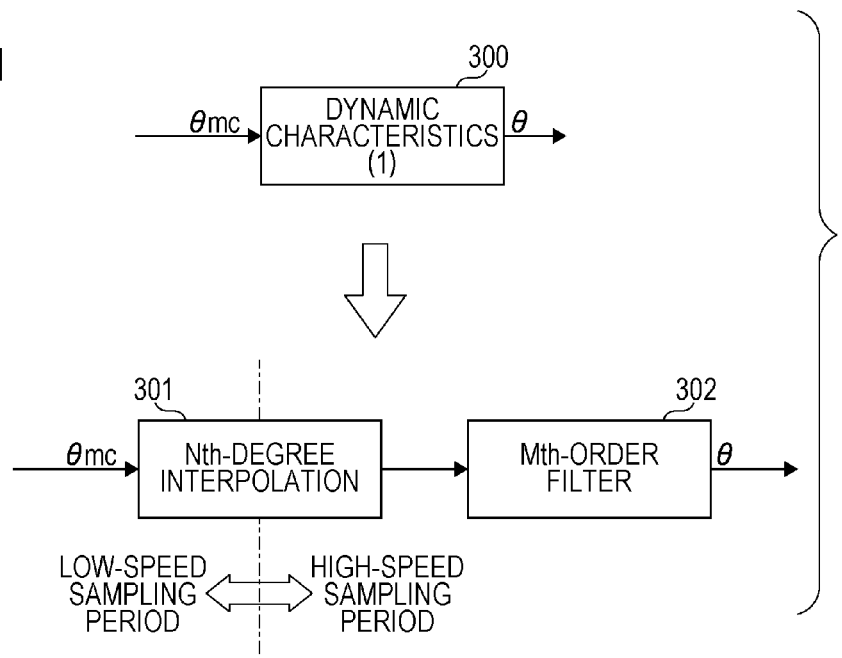
FIG. 1 is a block diagram of dynamic characteristics (1) of an elastic deformation compensation control device according to an embodiment of the present invention.

To address such an issue, the applicants for the present application configure the first dynamic characteristic computing unit 300 from an interpolating unit 301 that interpolates a rough trajectory (a control trajectory) of the welding tool calculated by the higher-layer CPU with a finer scale and a filter unit 302 that performs filtering on the output of the interpolating unit 301, as illustrated in FIG. 1. The interpolating unit 301 employs Nth-degree curve interpolation, and the filter unit 302 employs an Mth-order filter.

Figure 17:
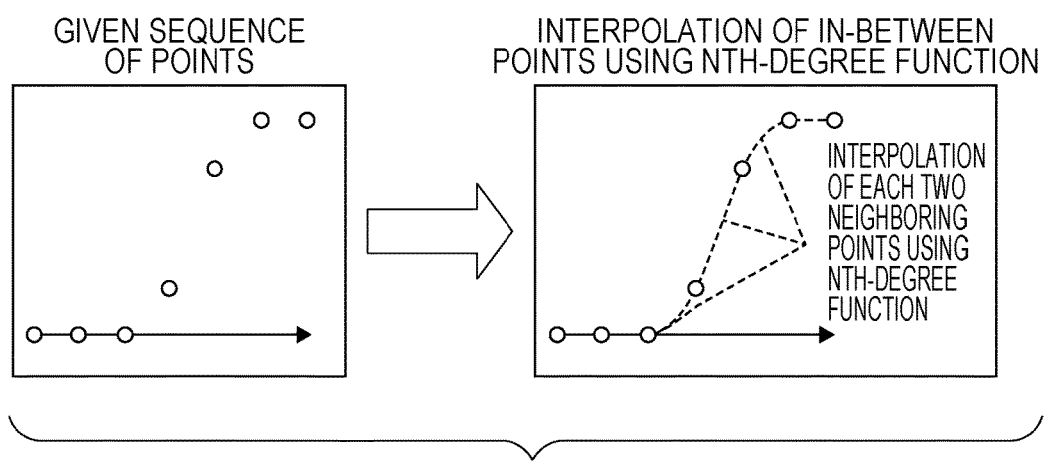
FIG. 17 illustrates Nth-degree interpolation.

The term "Nth-degree curve interpolation" performed by the interpolating unit 301 refers to interpolation performed between two adjacent points of a point sequence obtained from a coarse sampling using an Nth-degree function (curve). The most widely used Nth-degree curve interpolation is zeroth-order hold, where N=0, and a first-degree interpolation, where N=1. Second-degree or higher interpolation can be performed using, for example, a technique described in Japanese Patent No. 4119011. FIG. 17 illustrates an example of fifth-degree interpolation.

Despite the above description, the present inventor discovered that as illustrated in FIGS. 14A to 14E, vibration of the top end of the welding torch (in particular, vibration in the Z direction) occurs unless the number N for the Nth-degree curve and the number M for the Mth-order filter are appropriate. Accordingly, the present inventors made further study on the basis of the discovery.

As a result, the present inventors found that it is desirable that the elastic deformation compensation control device 10 (a control system that performs position control using elastic deformation compensation) include the first dynamic characteristic computing unit 300 formed from the interpolating unit 301 configured by Nth-degree curve interpolation and the filter unit 302 configured by an Mth-order filter and, in addition, (N+M) be greater than or equal to 4. In this manner, the occurrences of the vibration of the top end of the welding torch illustrated in FIGS. 14A to 14E can be prevented. Thus, the adverse effect of the elastic deformation of each of the shafts can be compensated for, and an operation such as weaving can be performed with high accuracy of trajectory.

It is desirable that a filter applied to the filter unit 302 be a filter given by the following expression (1):

[Formula 3]

$$\frac{a_0 \cdot s^0}{b_M \cdot s^M + b_{M-1} \cdot s^{M-1} + \ldots + b_1 \cdot s^1 + b_0 \cdot s^0} \quad (1)$$

In addition, an Mth-order filter given by the following expression (2) having a difference in the order between the denominator and the numerator is M may be employed:

[Formula 4]

$$\frac{a_p \cdot s^p + a_{p-1} \cdot s^{p-1} + \ldots + a_1 \cdot s^1 + a_0 \cdot s^0}{b_{M+p} \cdot s^{M+p} + b_{M+p-1} \cdot s^{M+p-1} + \ldots + b_1 \cdot s^1 + b_0 \cdot s^0} \quad (2)$$

FIG. 2A to FIG. 7B illustrate the result of control using the first dynamic characteristic computing unit 300 configured from the interpolating unit 301 configured by Nth-degree curve interpolation and the filter unit 302 configured by an Mth-order filter (where, N+M≥4).

Figure 2A:
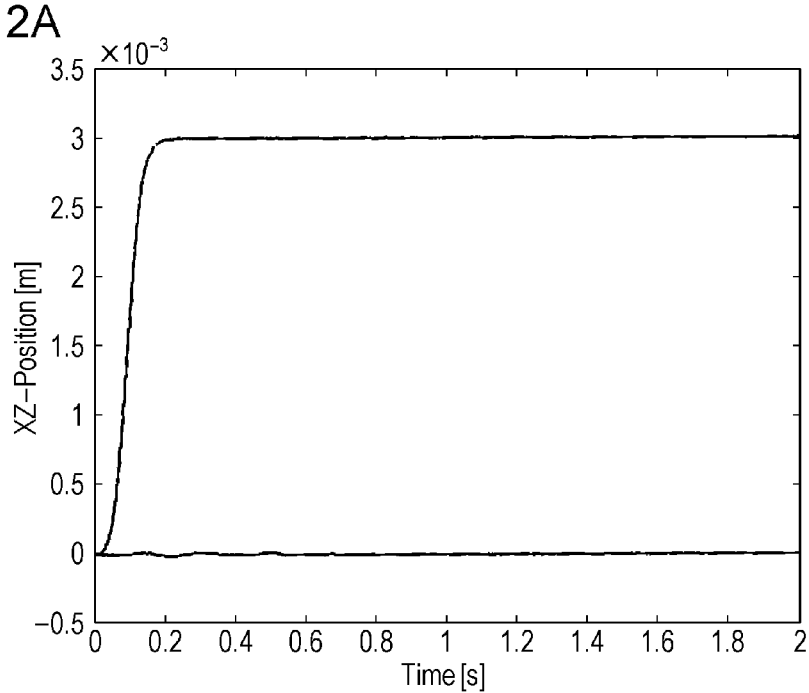
FIG. 2A illustrates the result of control (the operations in the X-axis and Z-axis directions) performed by the dynamic characteristics (1) configured using a technique according to the embodiment (N=4, M=0).
Figure 2B:
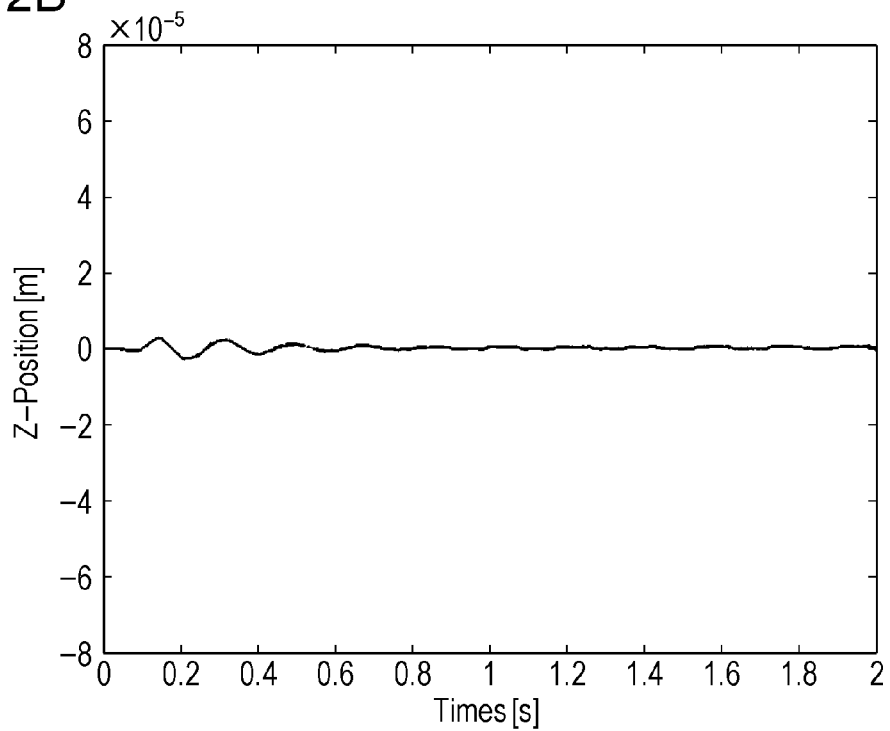
FIG. 2B illustrates the result of control (an enlarged view of the operation in the Z-axis direction) performed by the dynamic characteristics (1) configured using a technique according to the embodiment (N=4, M=0).

FIGS. 2A and 2B illustrate the result of control using the first dynamic characteristic computing unit 300 configured from only the interpolating unit 301 configured by fourth-degree curve interpolation. As illustrated in FIGS. 14A to 14E, in the existing technique, when a welding torch is moved in the Z direction by $3 \times 10^{-3}$ m, vibration with a significantly large amplitude of $20 \times 10^{-3}$ m is generated in the Z direction. However, by performing fourth-degree curve interpolation using the interpolating unit 301, the amplitude of the vibration can be decreased to a value less than or equal to $1 \times 10^{-5}$ m in the Z direction, as illustrated in FIG. 2B.

Figure 3A:
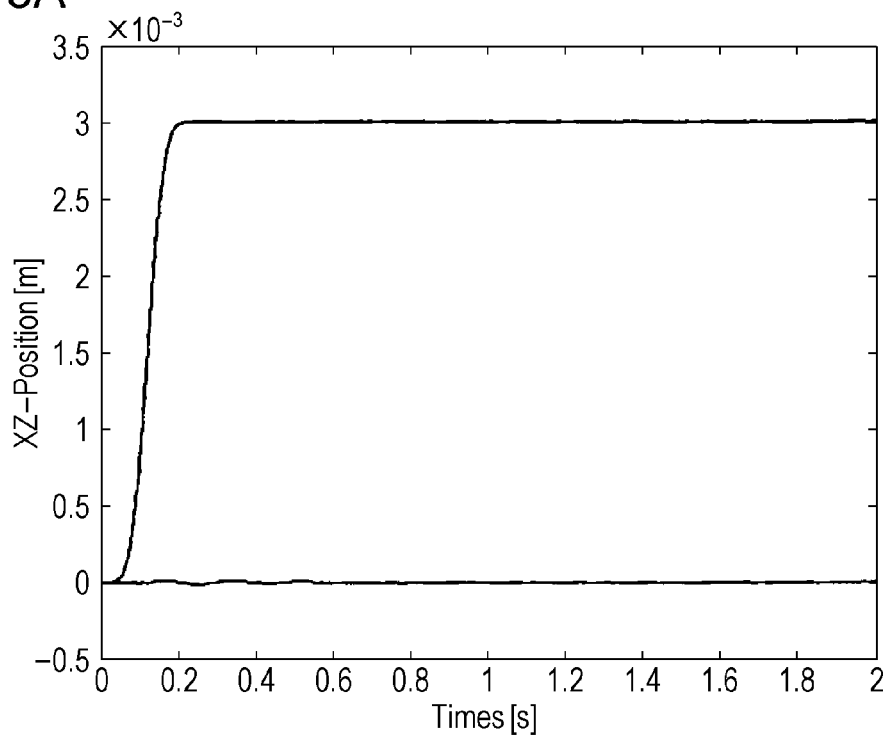
FIG. 3A illustrates the result of control (the operations in the X-axis and Z-axis directions) performed by the dynamic characteristics (1) configured using a technique according to the embodiment (N=5, M=0).
Figure 3B:
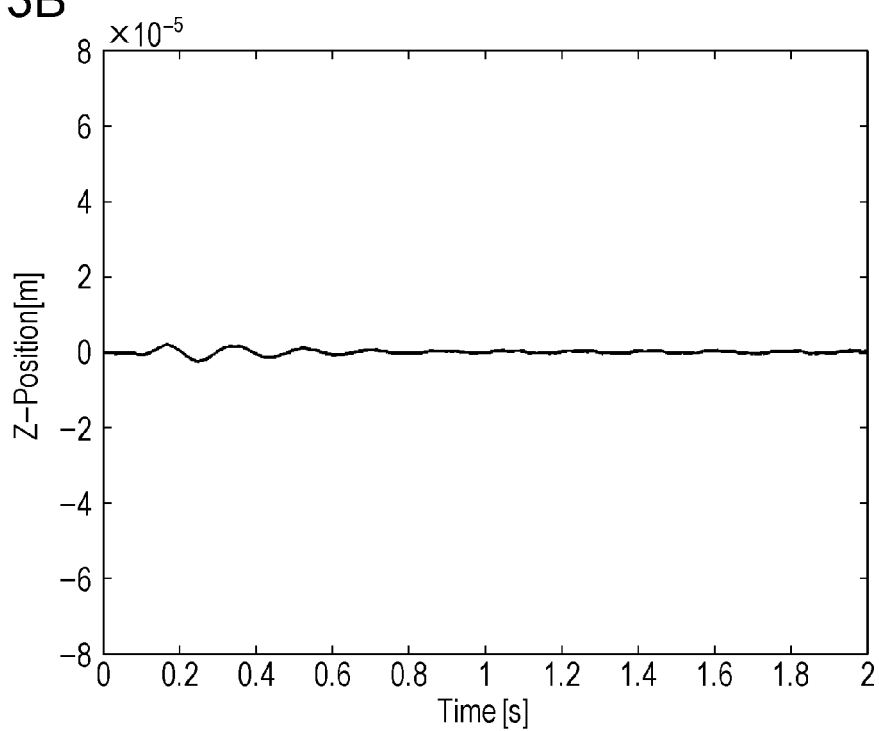
FIG. 3B illustrates the result of control (an enlarged view of the operation in the Z-axis direction) performed by the dynamic characteristics (1) configured using a technique according to the embodiment (N=5, M=0).

FIGS. 3A and 3B illustrate the result of control using the first dynamic characteristic computing unit 300 configured from only the interpolating unit 301 configured by fifth-degree curve interpolation. Even in such a case, the amplitude of the vibration can be decreased to a value less than or equal to $1 \times 10^{-5}$ m in the Z direction.

Figure 4A:
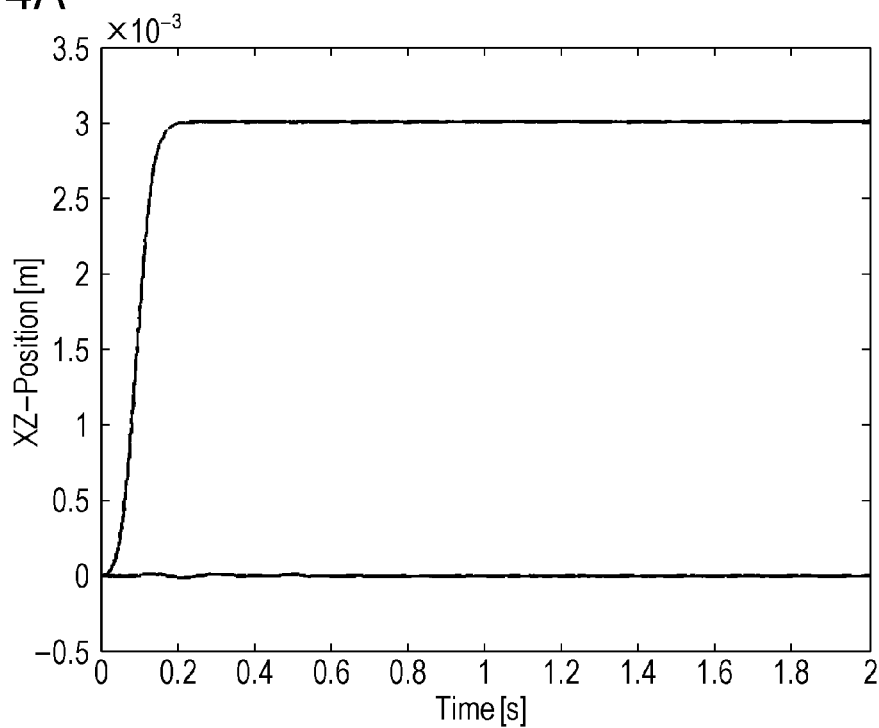
FIG. 4A illustrates the result of control (the operations in the X-axis and Z-axis directions) performed by the dynamic characteristics (1) configured using a technique according to the embodiment (N=3, M=1).
Figure 4B:
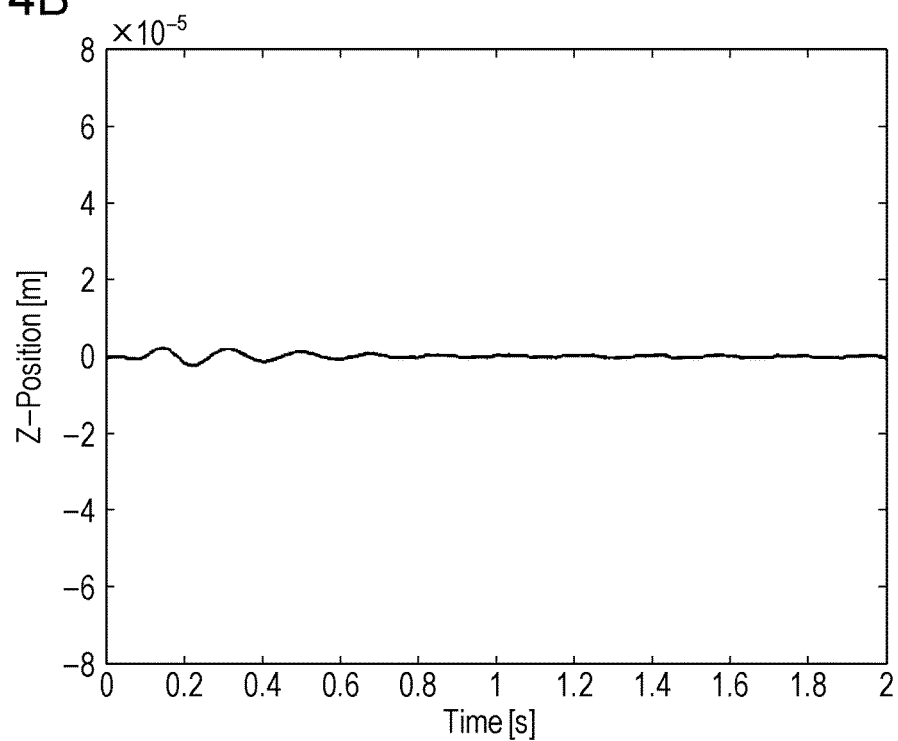
FIG. 4B illustrates the result of control (an enlarged view of the operation in the Z-axis direction) performed by the dynamic characteristics (1) configured using a technique according to the embodiment (N=3, M=1).

FIGS. 4A and 4B illustrate the result of control using the first dynamic characteristic computing unit 300 configured from the interpolating unit 301 configured by third-degree curve interpolation and the filter unit 302 that employs a first-order filter. Even in such a case, the amplitude of the vibration can be decreased to a value less than or equal to $1 \times 10^{-5}$ m in the Z direction.

Figure 5A:
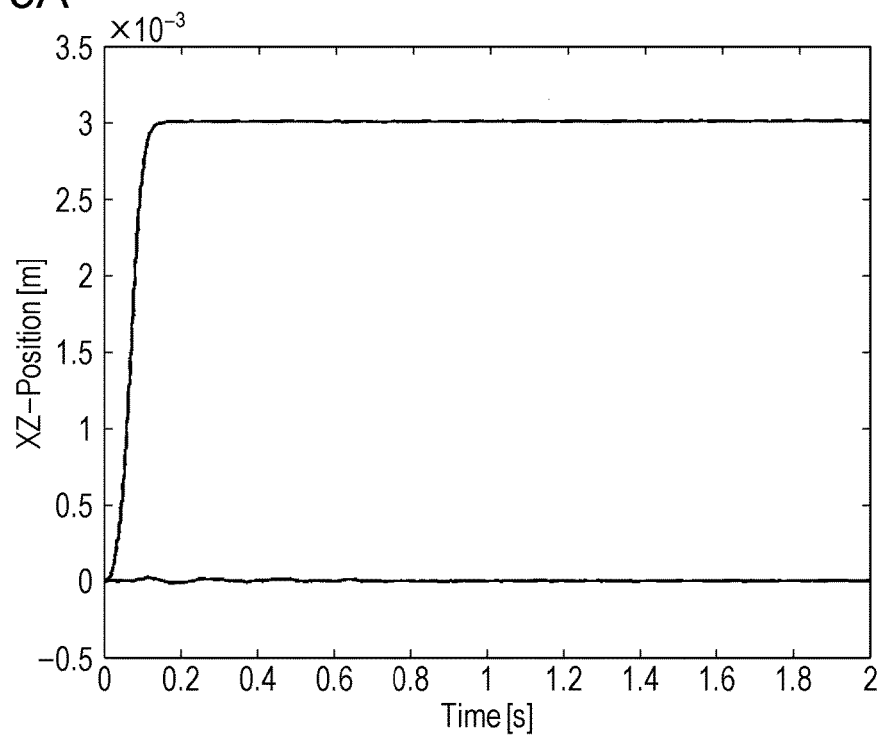
FIG. 5A illustrates the result of control (the operations in the X-axis and Z-axis directions) performed by the dynamic characteristics (1) configured using a technique according to the embodiment (N=2, M=2).
Figure 5B:
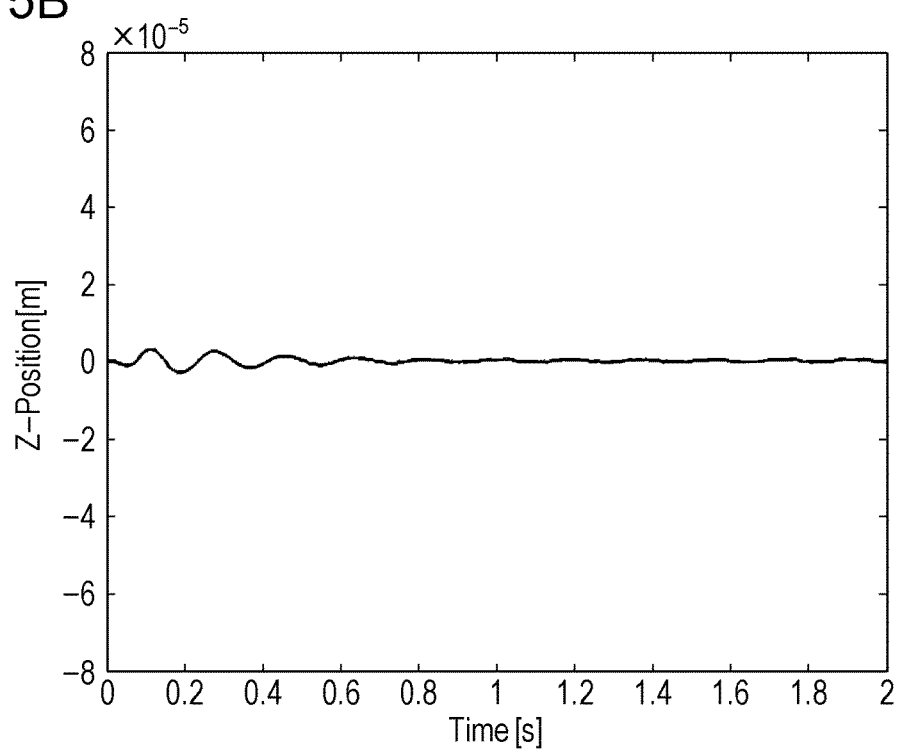
FIG. 5B illustrates the result of control (an enlarged view of the operation in the Z-axis direction) performed by the dynamic characteristics (1) configured using a technique according to the embodiment (N=2, M=2).

FIGS. 5A and 5B illustrate the result of control using the first dynamic characteristic computing unit 300 configured from the interpolating unit 301 configured by second-degree curve interpolation and the filter unit 302 that employs a second-order filter. Even in such a case, the amplitude of the vibration can be decreased to a value less than or equal to $1 \times 10^{-5}$ m in the Z direction.

Figure 6A:
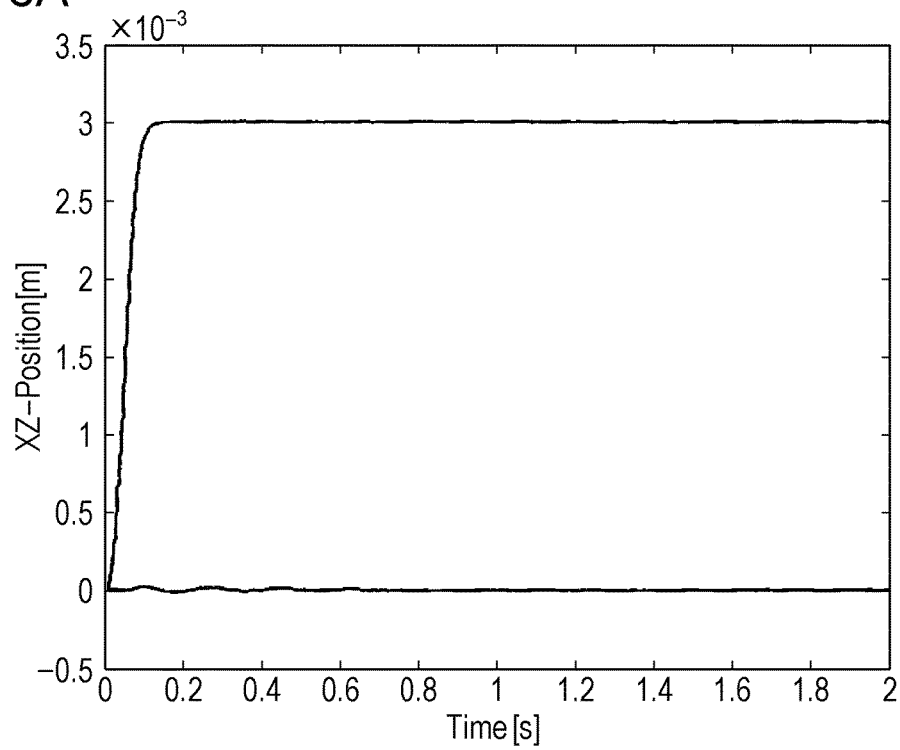
FIG. 6A illustrates the result of control (the operations in the X-axis and Z-axis directions) performed by the dynamic characteristics (1) configured using a technique according to the embodiment (N=1, M=3).
Figure 6B:
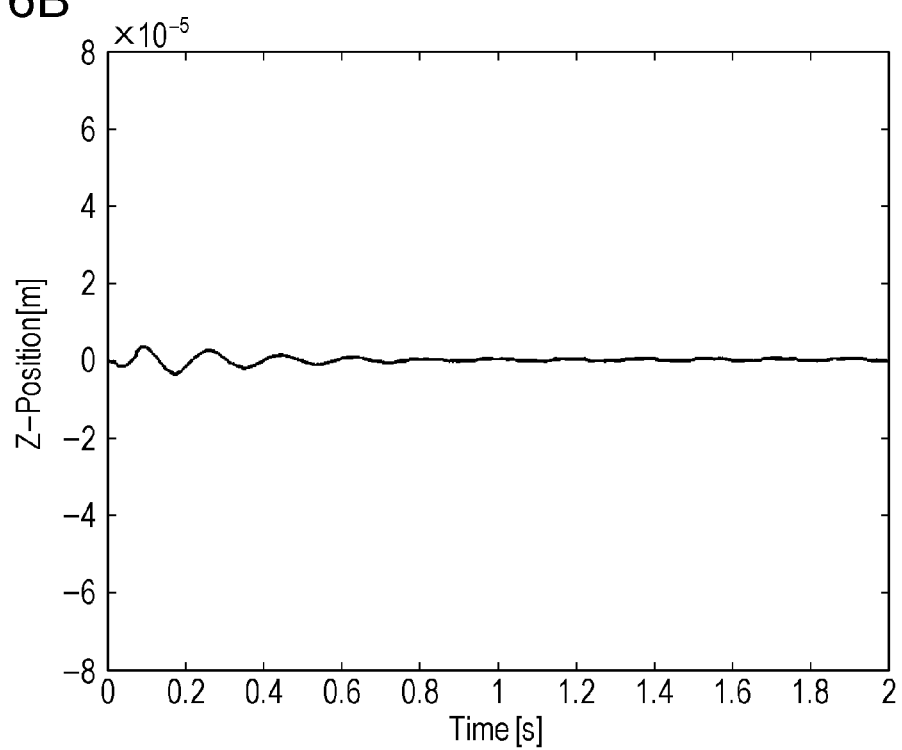
FIG. 6B illustrates the result of control (an enlarged view of the operation in the Z-axis direction) performed by the dynamic characteristics (1) configured using a technique according to the embodiment (N=1, M=3).

FIGS. 6A and 6B illustrate the result of control using the first dynamic characteristic computing unit 300 configured from the interpolating unit 301 configured by first-degree curve interpolation and the filter unit 302 that employs a third-order filter. Even in such a case, the amplitude of the vibration can be decreased to a value less than or equal to $1 \times 10^{-5}$ m in the Z direction.

Figure 7A:
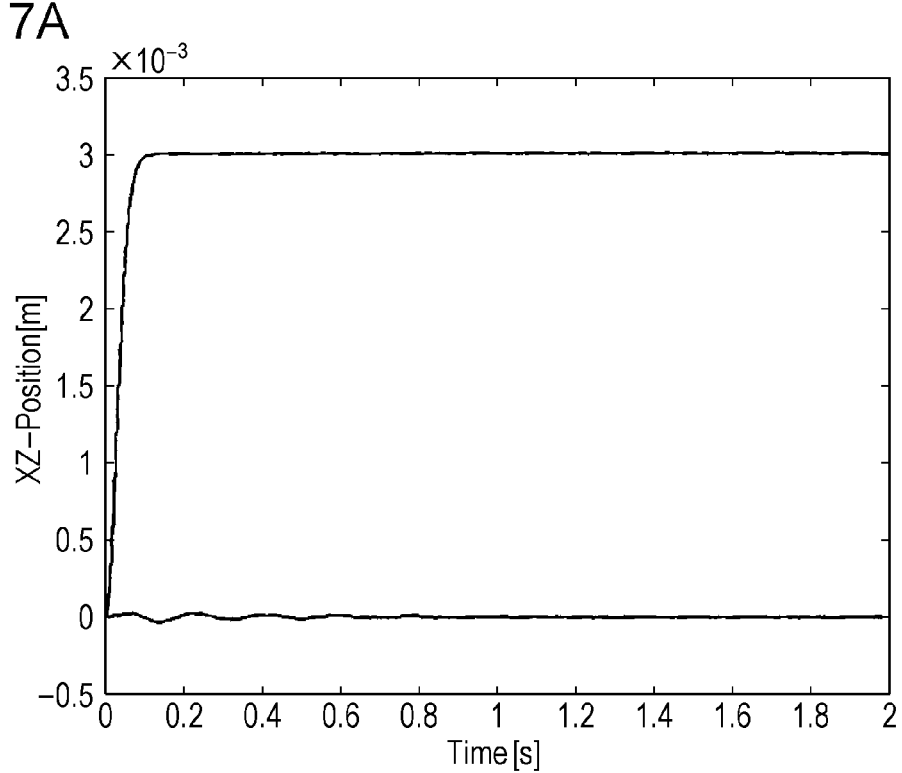
FIG. 7A illustrates the result of control (the operations in the X-axis and Z-axis directions) performed by the dynamic characteristics (1) configured using a technique according to the embodiment (N=0, M=4).
Figure 7B:
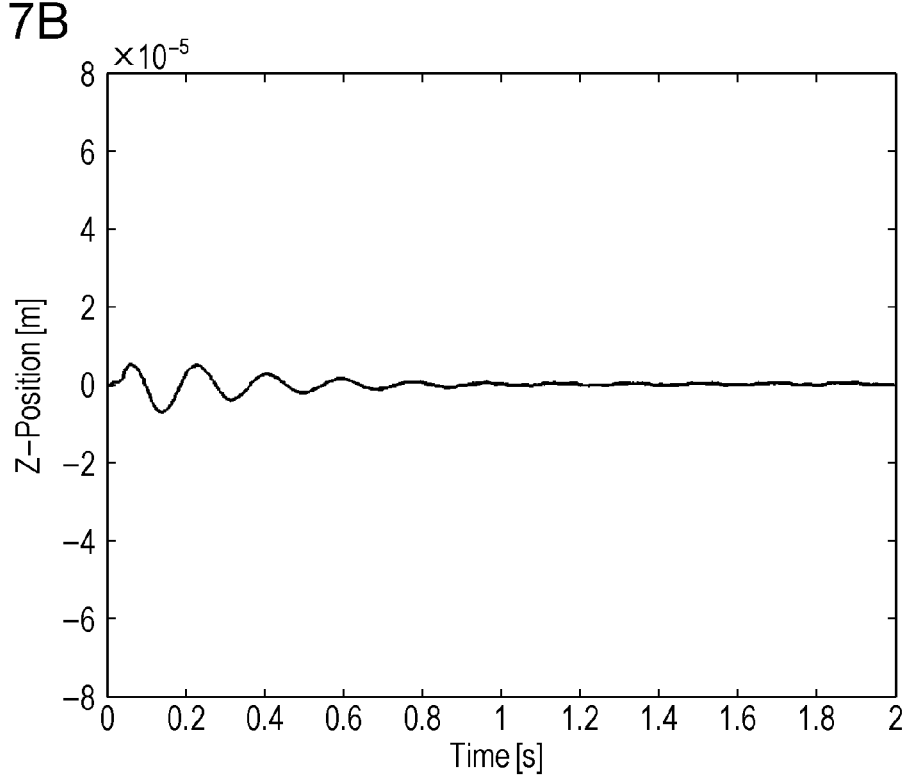
FIG. 7B illustrates the result of control (an enlarged view of the operation in the Z-axis direction) performed by the dynamic characteristics (1) configured using a technique according to the embodiment (N=0, M=4).

FIGS. 7A and 7B illustrate the result of control using the first dynamic characteristic computing unit 300 configured from only the filter unit 302 configured by a fourth-order filter. In such a case, the amplitude of the vibration is about $1 \times 10^{-5}$ m in the Z direction. The results illustrated in FIGS. 7A and 7B are slightly inferior to the results illustrated in FIG. 2A to FIG. 6B, but the amplitude of the vibration is apparently smaller than the results due to the existing technique illustrated in FIGS. 12A to 12E.

As described above, by configuring the first dynamic characteristic computing unit 300 from the interpolating unit 301 configured by the Nth-degree curve interpolation and the filter unit 302 configured by the Mth-order filter and setting (N+M) to a value greater than or equal to 4, vibration of the top end of the welding torch illustrated in FIGS. 14A to 14E can be reliably prevented and, thus, the adverse effect of the elastic deformation of each of the shafts can be compensated for, and an operation such as weaving can be performed with high accuracy of trajectory.

Second Embodiment

Note that the waveform of the Mth-order filter applied to the filter unit 302 may have a continuous (M−1)th derivative value in terms of a waveform of a step response of the Mth-order filter. In contrast, the waveform of the Mth-order filter applied to the filter unit 302 may have a continuous (M−2)th derivative value in terms of a waveform of an impulse response of the Mth-order filter.

That is, while the first embodiment above has been described with reference to the Mth-order filter (expression (1)) that can be expressed as the transfer function of continuous time, the Mth-order filter can be approximated by a moving average filter if the Mth-order filter is subjected to impulse response approximation. In addition, if the Mth-order filter can be expressed in the form of a fraction, the difference in the order between the denominator and the numerator is M. Thus, a derivative value up to the (M−1)th derivative value of a step response is continuous, and the Mth derivative value is non-continuous. That is, a variety of filters including a moving average filter have characteristic that is the same as the Mth-order filter due to the above-described characteristics. A filter having continuous derivative value up to the (M−1)th derivative value of step response can be equivalent to the Mth-order filter. Such an equivalent filter can be employed for the filter unit 302 that provides the operation and effect that are substantially the same as those of the first embodiment.

FIGS. 8A and 8B, FIGS. 9A and 9B, FIGS. 11A to 11D, and FIGS. 12A to 12E illustrate the waveforms of the filters applied to the filter unit 302 according to the second embodiment.

Figure 8A:
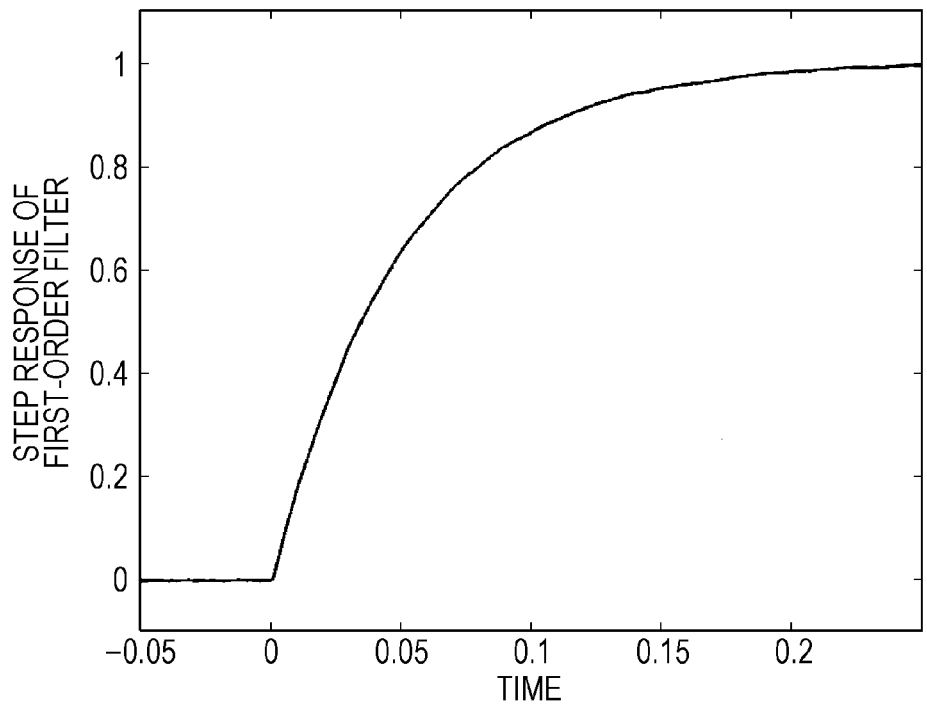
FIG. 8A illustrates the step response of a first-order filter.
Figure 8B:
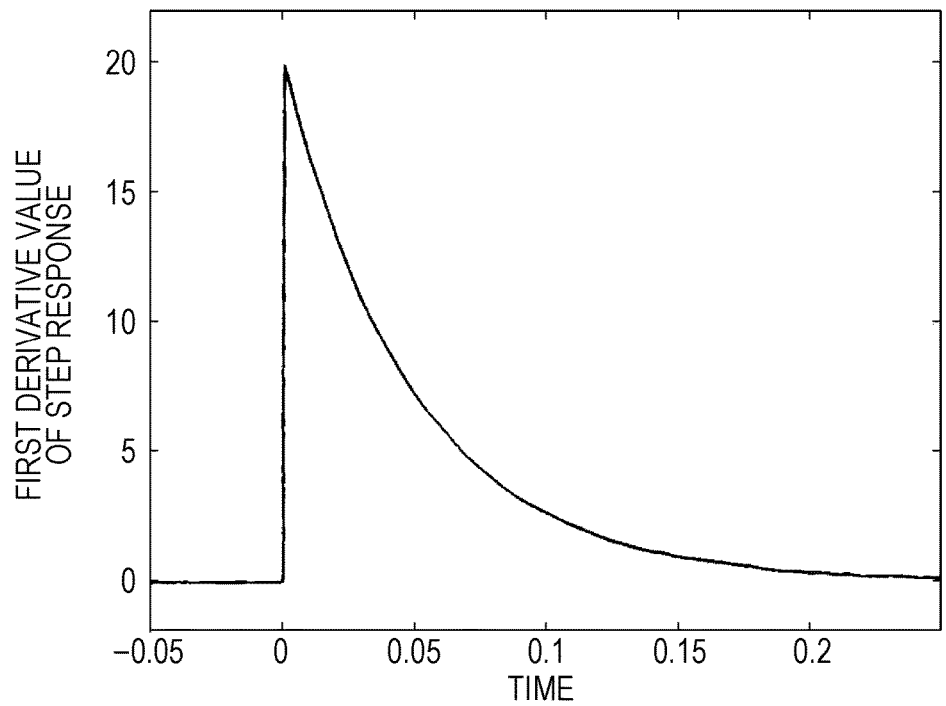
FIG. 8B illustrates the first derivative value of the step response of a first-order filter.

FIGS. 8A and 8B relate to the first-order filter according to the first embodiment. A graph in FIG. 8A illustrates the waveform of a step response of the first-order filter. Although the waveform is continuous, the waveform of the first derivative value of the step response waveform is non-continuously changed at a time 0, as illustrated by the graph of FIG. 8B.

Figure 9A:
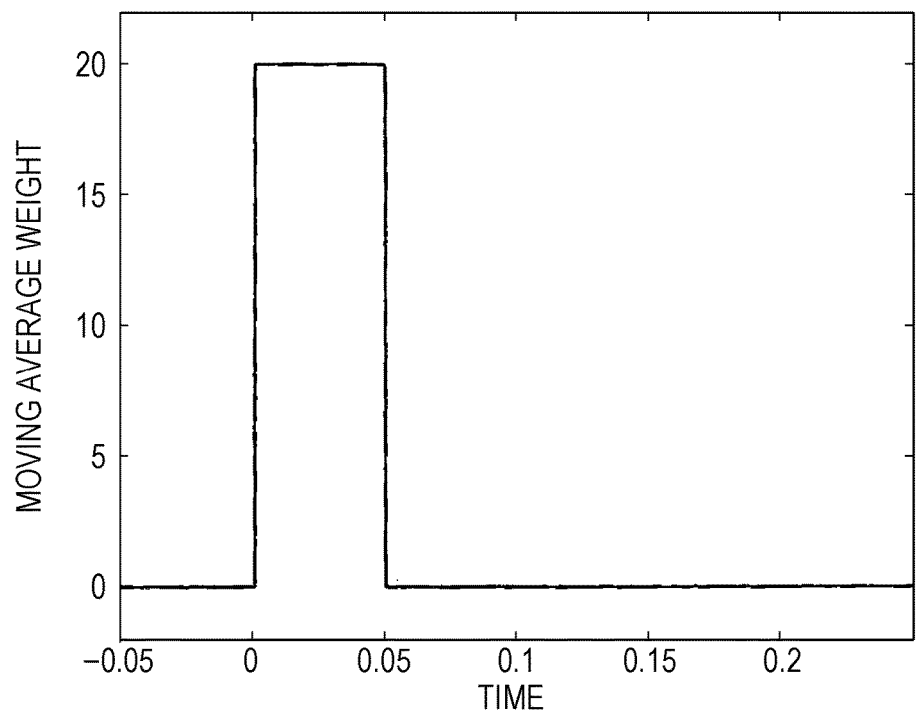
FIG. 9A illustrates the moving average weight of a moving average filter corresponding to a first order.
Figure 9B:
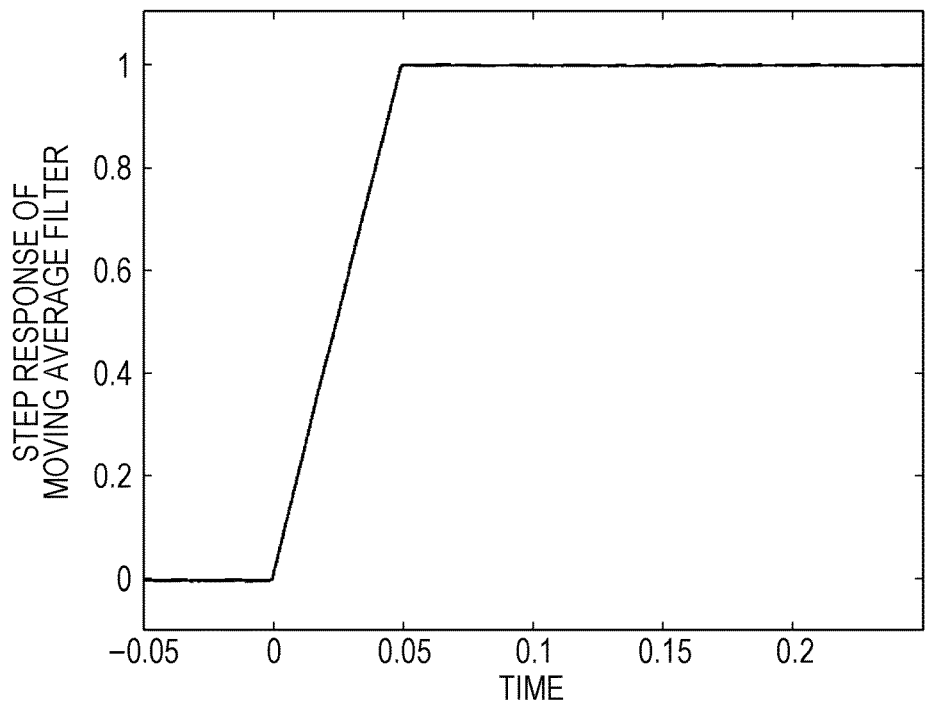
FIG. 9B illustrates the step response of a moving average filter corresponding to a first order.
Figure 9C:
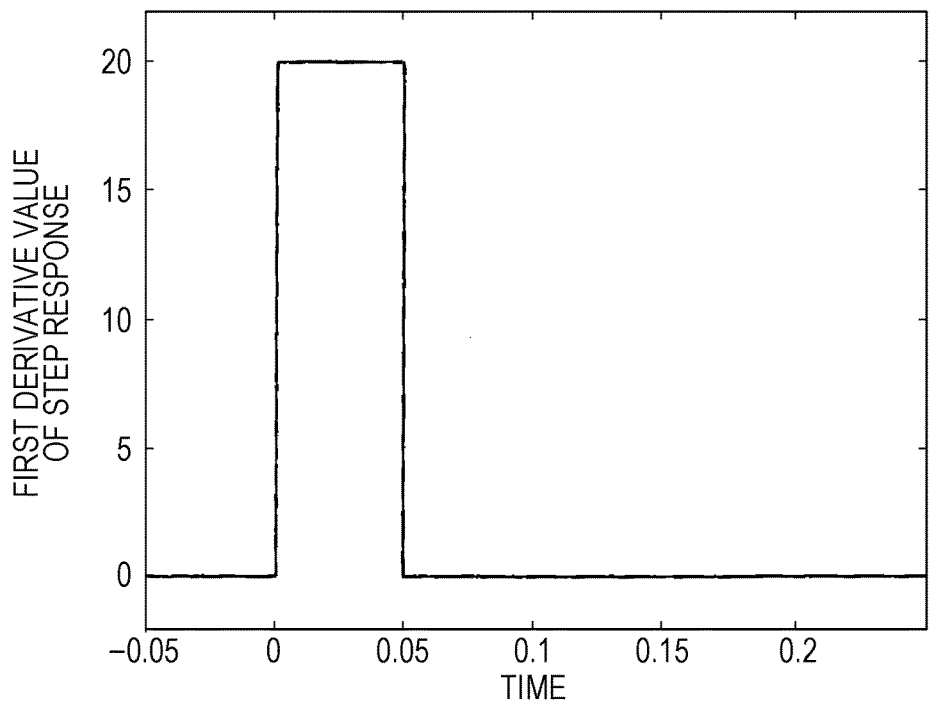
FIG. 9C illustrates the first derivative value of the step response of the moving average filter corresponding to a first order.

FIGS. 9A and 9B illustrate an example of a moving average filter corresponding to the first order. Since N−1=0, the (N−1)th derivative value of a step response, that is, even a step response itself that is not differentiated is continuous, and the Nth derivative value, that is, the first derivative value is non-continuous.

Figure 10A:
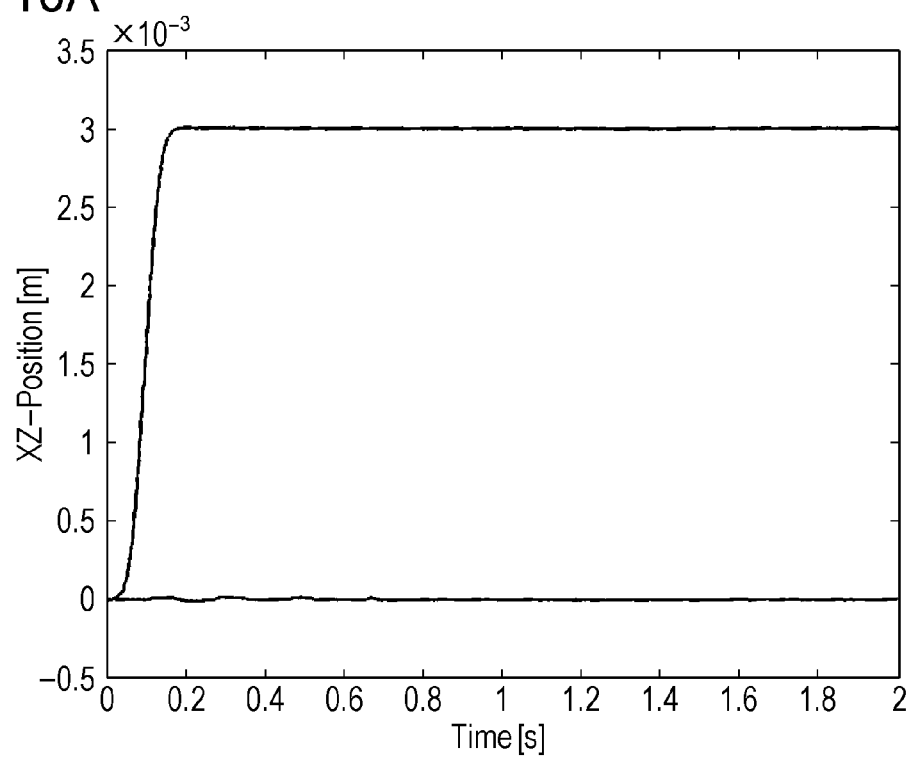
FIG. 10A illustrates the result of control (the operations in the X-axis and Z-axis directions) performed using third-degree interpolation and a moving average filter corresponding to a first order.
Figure 10B:
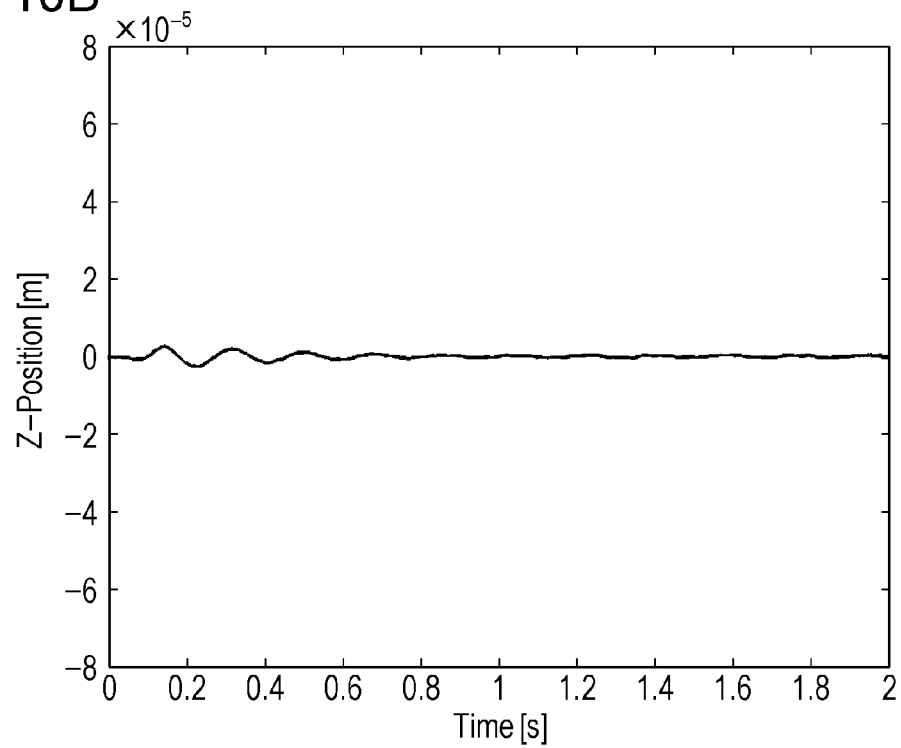
FIG. 10B illustrates the result of control (an enlarged view of the operation in the Z-axis direction) performed using third-degree interpolation and a moving average filter corresponding to a first order.
Figure 11A:
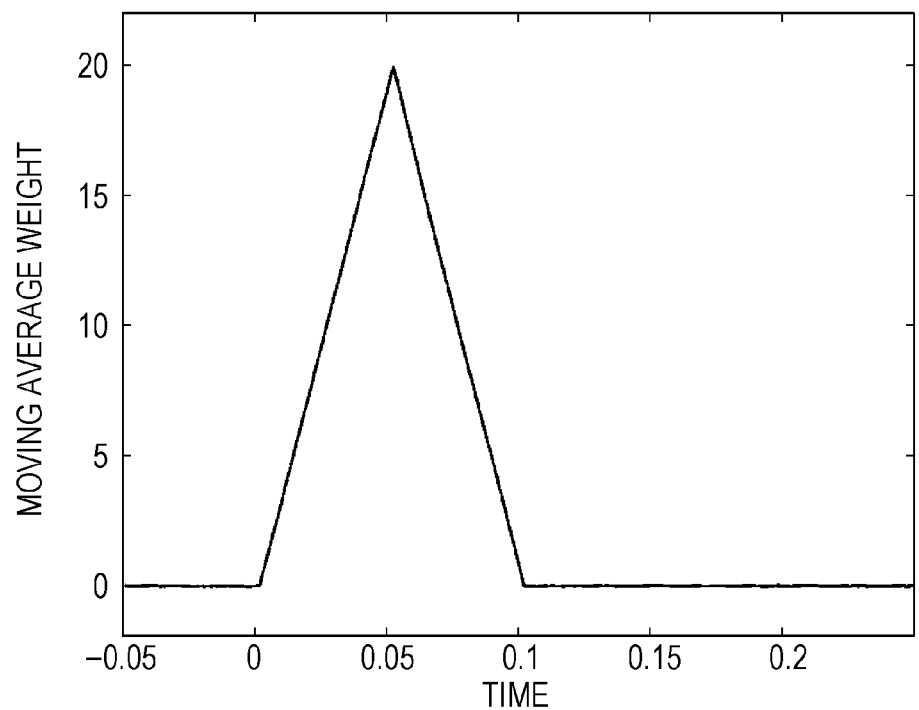
FIG. 11A illustrates the moving average weight of a moving average filter corresponding to a second order.
Figure 11B:
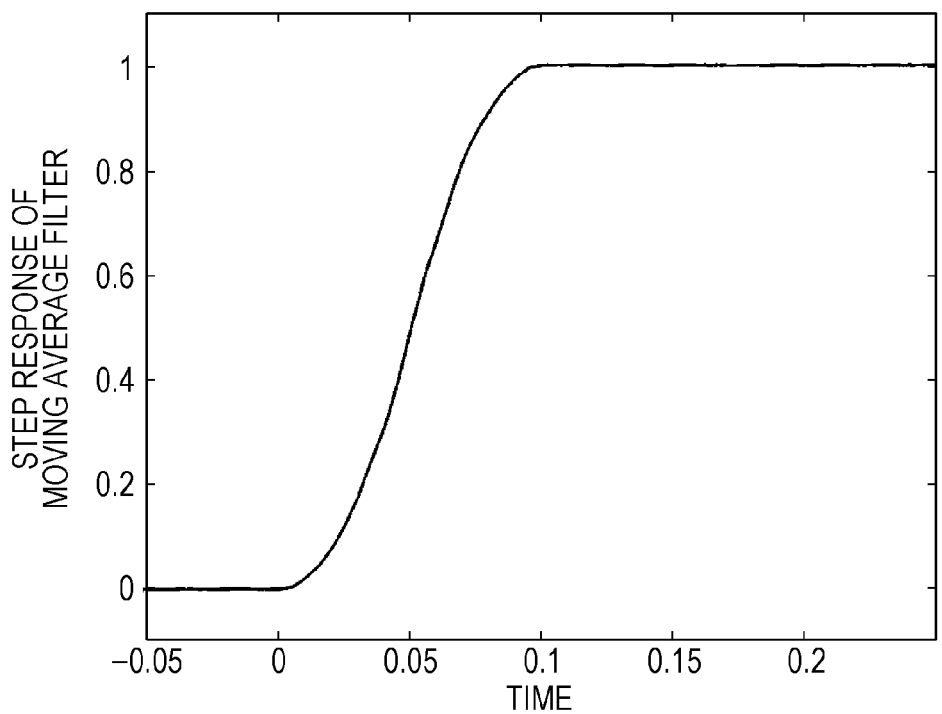
FIG. 11B illustrates the step response of a moving average filter corresponding to a second order.
Figure 11C:
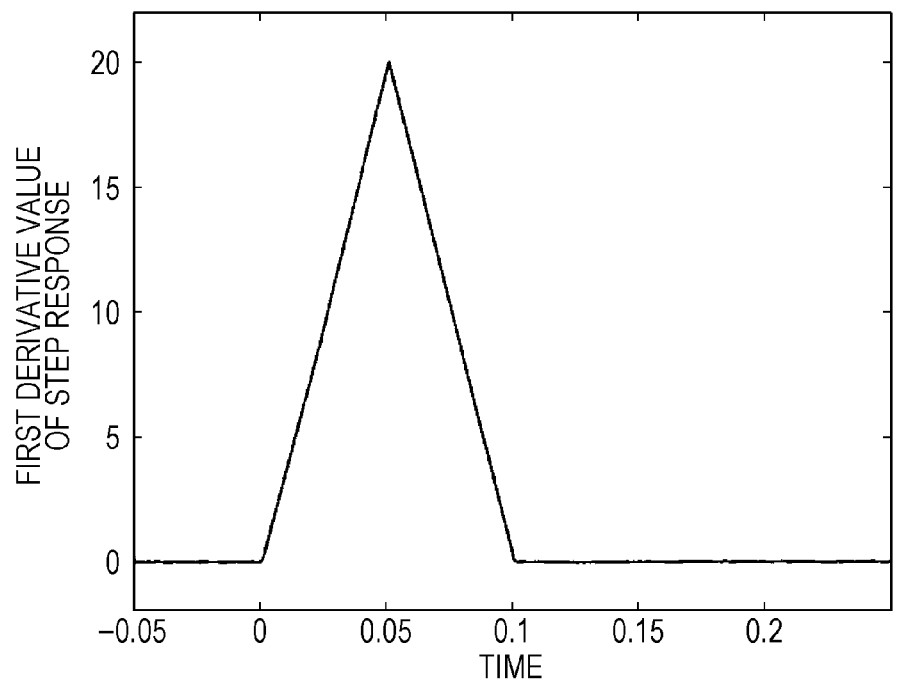
FIG. 11C illustrates the first derivative value of the step response of the moving average filter corresponding to a second order.
Figure 11D:
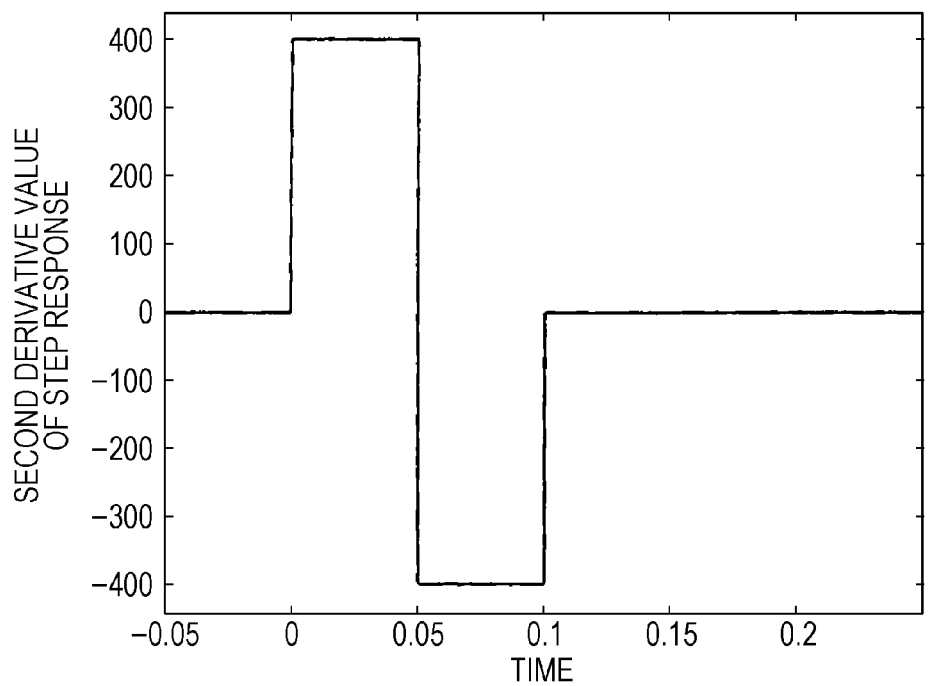
FIG. 11D illustrates the second derivative value of the step response of the moving average filter corresponding to a second order.
Figure 12A:
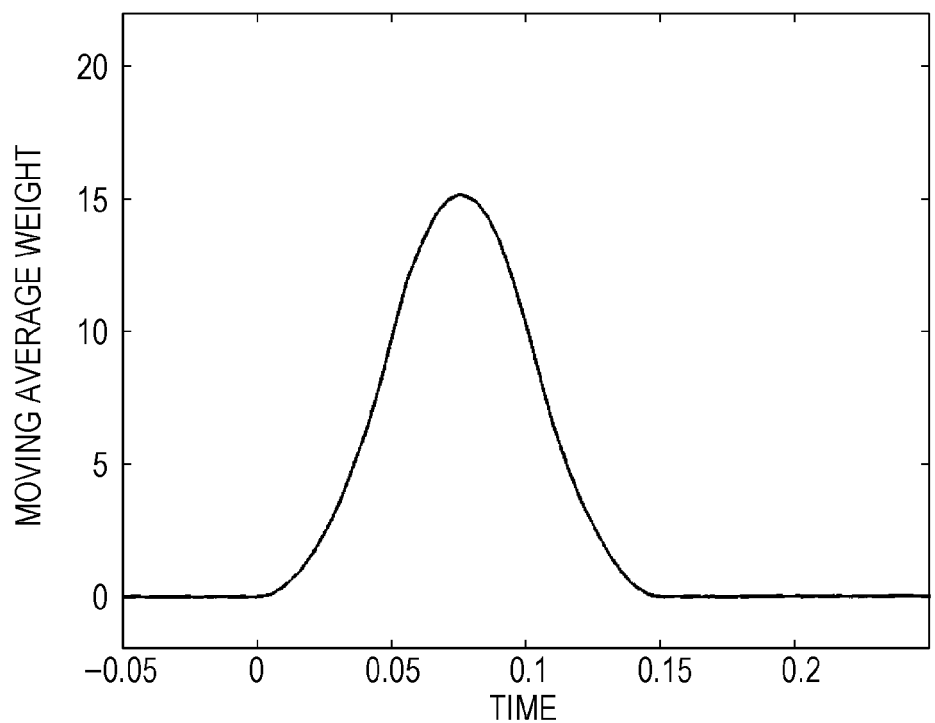
FIG. 12A illustrates the moving average weight of a moving average filter corresponding to a third order.
Figure 12B:
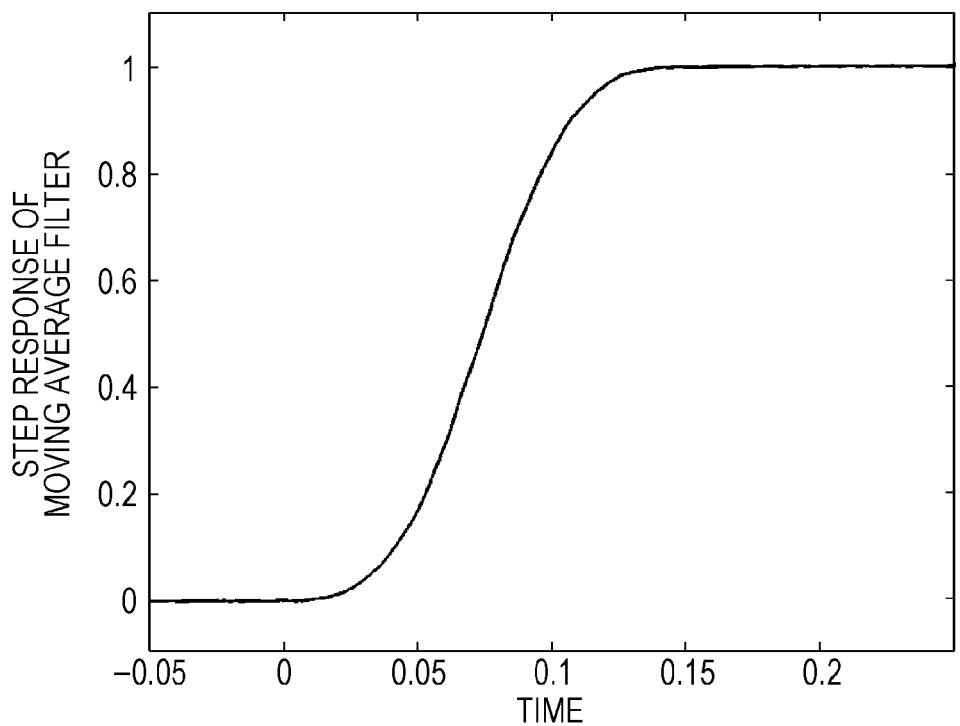
FIG. 12B illustrates the step response of a moving average filter corresponding to a third order.
Figure 12C:
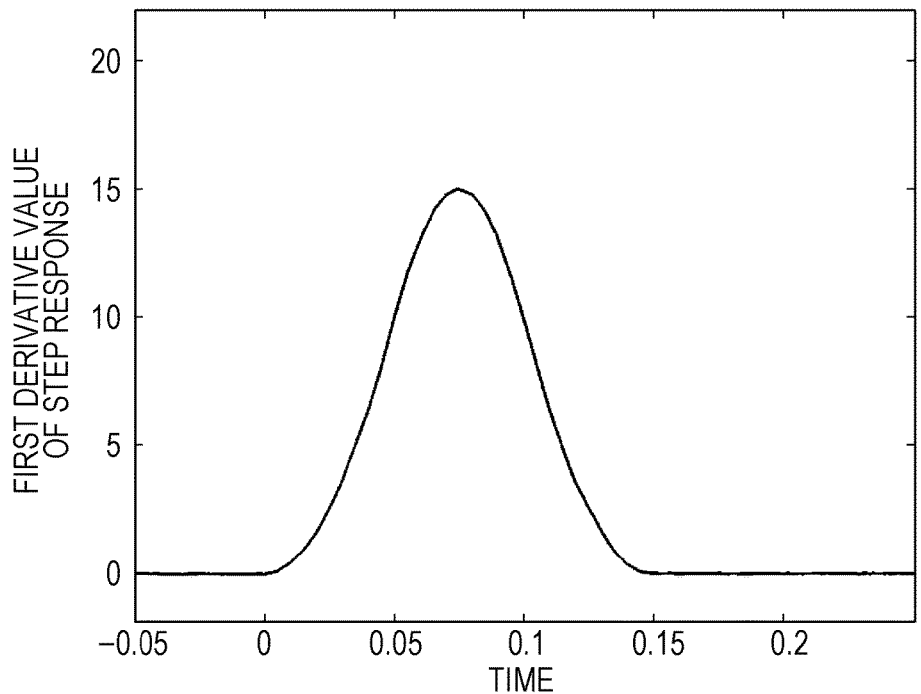
FIG. 12C illustrates the first derivative value of the step response of the moving average filter corresponding to a third order.
Figure 12D:
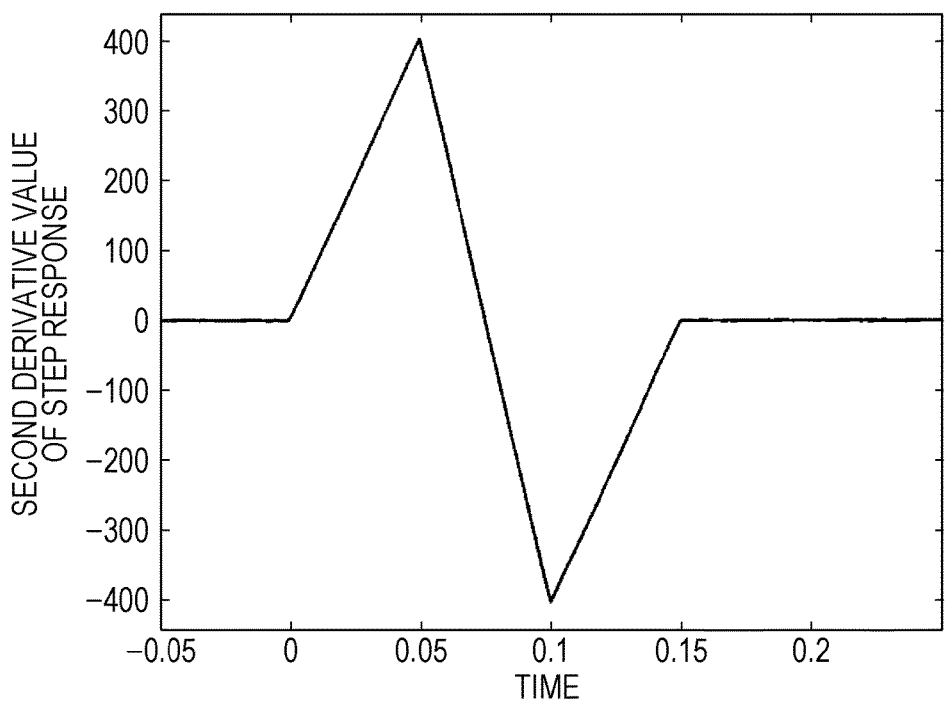
FIG. 12D illustrates the second derivative value of the step response of the moving average filter corresponding to a third order.
Figure 12E:
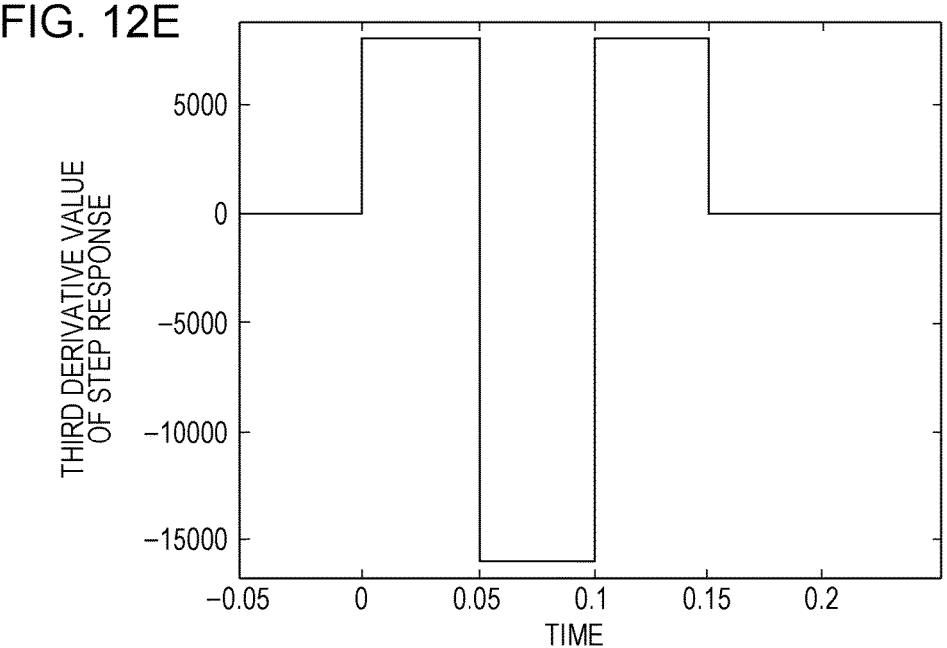
FIG. 12E illustrates the third derivative value of the step response of the moving average filter corresponding to a third order.

FIGS. 10A and 10B illustrate the result of control when the moving average filter illustrated in FIGS. 9A and 9B is applied to the filter unit 302 and third-degree interpolation is applied to the interpolating unit 301.

As illustrated in FIG. 10B, by using such a first dynamic characteristic computing unit 300, the amplitude of vibration in the Z direction can be decreased to a value less than or equal to $1 \times 10^{-5}$ m.

In addition, FIGS. 11A to 11D illustrate an example of a moving average filter corresponding to the second order. A derivative value up to the (N−1 (=1))th derivative value of a step response is continuous, and the N (=2)th derivative value is non-continuous. By applying the moving average filter illustrated in FIGS. 11A to 11D to the filter unit 302 and applying second-degree interpolation to the interpolating unit 301, vibration can be prevented as in FIGS. 10A and 10B.

FIG. 12A to FIG. 12E illustrate an example of a moving average filter corresponding to the third order. A derivative value up to the (N−1 (=2))th derivative value of a step response is continuous, and the N (=3)th derivative value is non-continuous. By applying the moving average filter illustrated in FIGS. 12A to 12E to the filter unit 302 and applying first-degree interpolation to the interpolating unit 301, vibration can be prevented as in FIGS. 10A and 10B.

Similarly, even when control is performed by using only the filter unit 302 having the moving average filter corresponding to the fourth order applied thereto after zeroth-order hold, the effect of control that is the same as in FIGS. 10A and 10B can be provided.

Note that in the case of a moving average filter, the weight coincides with an impulse response, and the derivative value of a step response coincides with an impulse response. Accordingly, the (N−1)th derivative value of the step response is equivalent to the (N−2)th derivative value of the impulse response.

Third Embodiment

The present inventors further studied the elastic deformation compensation control device 10 of the first embodiment (refer to FIG. 13) and discovered the following results.

That is, in the elastic deformation compensation control device 10 illustrated in FIG. 13, if Gda=0, vibration of the top end of the welding torch can be reliably prevented even when the first dynamic characteristic computing unit 300 is configured from the interpolating unit 301 configured by the Nth-degree curve interpolation, where (N+M) is 3 or more, and the filter unit 302 configured by an Mth-order filter. In addition, the adverse effect of the elastic deformation of each of the shafts can be compensated for, and an operation such as weaving can be performed with high accuracy of trajectory.

In particular, the present inventors also discovered that if Gda=Gdv=0, the first dynamic characteristic computing unit 300 can be configured from the interpolating unit 301 configured by the Nth-degree curve interpolation and the filter unit 302 configured by the Mth-order filter, where (N+M) is 2 or more.

That is, if Gda≠0, (N+M) needs to be greater than or equal to 4. However, if Gda=0, it is only required that (N+M) is 3 or more. If Gda=Gdv=0, it is only required that (N+M) is 2 or more. At that time, the high-frequency cutoff characteristic of the dynamic characteristics (2) needs to be higher than or equal to the high-frequency cutoff characteristic of the dynamic characteristics (1).

As described above, according to the elastic deformation compensation control device 10 of the present invention, the first dynamic characteristic computing unit 300 is configured from the interpolating unit 301 configured by Nth-degree curve interpolation and the filter unit 302 configured by an Mth-order filter, and (N+M) is set to a value greater than 4 or more. In this manner, vibration of the top end of the welding torch can be reliably prevented, and the adverse effect of the elastic deformation of each of the shafts can be compensated for. Thus, an operation such as weaving can be performed with high accuracy of trajectory.

The presently disclosed embodiments should in all respects be considered to be illustrative and not limiting. The scope of the present invention is set forth not by the foregoing description but by the scope of the appended claims, and is intended to include meanings equivalent to the scope of the patent claims and all modifications within the scope of the invention.

Figure 15:
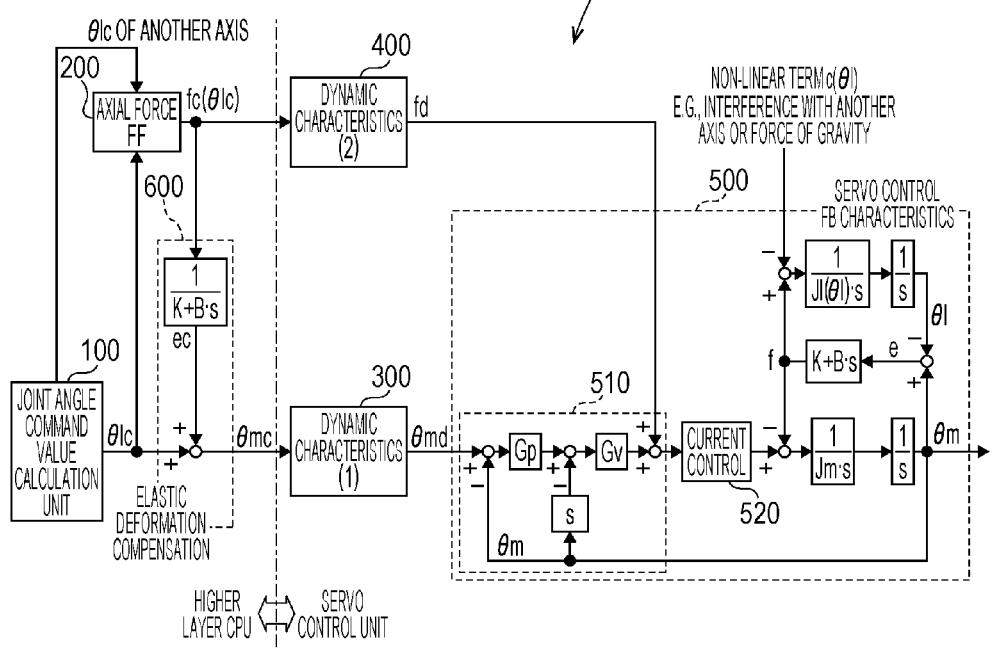
FIG. 15 is a block diagram of another elastic deformation compensation control device to which the dynamic characteristics (1) according to the embodiment is applied.

For example, the technique of the present invention is applicable to an elastic deformation compensation control device 20 illustrated in FIG. 15 as well. In the elastic deformation compensation control device 20, the motor angle control unit 510 that constitutes the device 20 does not include the speed feedforward control and/or the acceleration feedforward control. By applying the technique of the present invention to the device 20, the operations and effects that are substantially the same as those described in the first to third embodiments can be provided.

This application claims the benefit of Japanese Patent Application No. 2013-027947 filed Feb. 15, 2013, which is hereby incorporated by reference herein in its entirety.

REFERENCE SIGNS LIST 1 articulated robot
10, 20 elastic deformation compensation control device
100 joint angle command value calculation unit
200 axial force torque calculation unit (axial force FF)
300 first dynamic characteristic computing unit (dynamic characteristics (1))
400 second dynamic characteristic computing unit (dynamic characteristics (2))
500 feedback control unit (servo control FB characteristics)
600 motor angle command value calculation unit (elastic deformation compensation)
510 motor angle control unit
520 motor current control unit (current control)

The invention claimed is:

1. An elastic deformation compensation control device for an articulated robot, the articulated robot including a motor for driving a plurality of joint shafts of the articulated robot and an arm connected to the motor via a speed reducer that elastically deforms, the device driving the joint shafts to cause a tool attached to the articulated robot to perform a desired operation, the device comprising:

a joint angle command value calculation unit configured to calculate a joint angle command value θlc of each of the joint shafts for realizing a desired tool operation and output the joint angle command value θlc;

an axial force torque calculation unit configured to calculate an axial force torque fc that is generated when each of the joint shafts operates as instructed by the joint angle command value θlc and that is exerted on the joint shaft from the joint angle command value θlc on the basis of a kinetic model and output the axial force torque fc;

a motor angle command value calculation unit configured to calculate a motor angle command value θmc from the joint angle command value θlc and the axial force torque fc on the basis of a parameter of the joint shaft including a rigidity parameter and output the motor angle command value θmc;

a first dynamic characteristic computing unit having a high-frequency cutoff characteristic including a cutoff frequency that is lower than the natural vibration frequency of the robot, the first dynamic characteristic computing unit performing a filtering process on the motor angle command value θmc and outputting the motor angle target value θmd subjected to the filtering process;

a motor angle control unit configured to receive the motor angle target value θmd as a target value for the motor; and a motor current control unit configured to receive, as a target value, a value obtained by adding the axial force torque compensation value fd to a motor torque command value output from the motor angle control unit, wherein the first dynamic characteristic computing unit is configured from an interpolation unit configured by Nth-degree curve interpolation and a filter unit configured by an Mth-order filter, and (N+M) is set to a value greater than or equal to 4.

2. The elastic deformation compensation control device for an articulated robot according to claim 1, wherein the Mth-order filter that constitutes the filter unit is given by the following expression (1):

[Formula 1]

$$\frac{a_0 \cdot s^0}{b_M \cdot s^M + b_{M-1} \cdot s^{M-1} + \ldots + b_1 \cdot s^1 + b_0 \cdot s^0}. \quad (1)$$

3. The elastic deformation compensation control device for an articulated robot according to claim 1, wherein the Mth-order filter that constitutes the filter unit is given by the following expression (2):

[Formula 2]

$$\frac{a_p \cdot s^p + a_{p-1} \cdot s^{p-1} + \ldots + a_1 \cdot s^1 + a_0 \cdot s^0}{b_{M+p} \cdot s^{M+p} + b_{M+p-1} \cdot s^{M+p-1} + \ldots + b_1 \cdot s^1 + b_0 \cdot s^0}. \quad (2)$$

4. The elastic deformation compensation control device for an articulated robot according to claim 1, wherein an (M−1)th derivative value of a waveform of a step response of the Mth-order filter that constitutes the filter unit is continuous.

5. The elastic deformation compensation control device for an articulated robot according to claim 1, wherein an (M−2)th derivative value of a waveform of an impulse response of an Mth-order filter that constitutes the filter unit is continuous.

* * * * *